(12) United States Patent
Tsukagoshi

(10) Patent No.: US 11,240,480 B2
(45) Date of Patent: Feb. 1, 2022

(54) CLIENT APPARATUS, CLIENT APPARATUS PROCESSING METHOD, SERVER, AND SERVER PROCESSING METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/499,475

(22) PCT Filed: Apr. 19, 2018

(86) PCT No.: PCT/JP2018/016067
§ 371 (c)(1),
(2) Date: Sep. 30, 2019

(87) PCT Pub. No.: WO2018/207581
PCT Pub. Date: Nov. 15, 2018

(65) Prior Publication Data
US 2021/0112232 A1 Apr. 15, 2021

(30) Foreign Application Priority Data
May 9, 2017 (JP) .............................. JP2017-093436

(51) Int. Cl.
*H04N 13/178* (2018.01)
*H04N 13/161* (2018.01)
(Continued)

(52) U.S. Cl.
CPC ......... *H04N 13/178* (2018.05); *H04L 65/601* (2013.01); *H04L 65/607* (2013.01); *H04N 13/161* (2018.05); *H04N 2013/0088* (2013.01)

(58) Field of Classification Search
USPC .......................................................... 348/43
See application file for complete search history.

(56) References Cited

U.S. PATENT DOCUMENTS 9,003,424 B1 4/2015 Mendes Da Costa et al.
2001/0044725 A1* 11/2001 Matsuda ................. G10L 19/00
704/269

(Continued)

FOREIGN PATENT DOCUMENTS

CN 1397139 A 2/2003
CN 106210865 A 12/2016
(Continued)

OTHER PUBLICATIONS

International Search Report dated Jun. 7, 2018 in PCT/JP2018/016067 filed Apr. 19, 2018.

*Primary Examiner* — Behrooz M Senfi
(74) *Attorney, Agent, or Firm* — Oblon, McClelland, Maier & Neustadt, L.L.P.

(57) ABSTRACT

Multiple clients (viewers) are allowed to share their VR spaces for communication with one another. A server-distributed stream including a video stream obtained by encoding a background image is received from a server. A client-transmitted stream including representative image meta information for displaying a representative image of another client is received from another client apparatus. The video stream is decoded to obtain the background image. The image data of the representative image is generated on the basis of the representative image meta information. Display image data is obtained by synthesizing the representative image on the background image.

12 Claims, 21 Drawing Sheets

(51) Int. Cl.
*H04L 29/06* (2006.01)
*H04N 13/00* (2018.01)

(56) References Cited

U.S. PATENT DOCUMENTS

| | | |
|---|---|---|
| 2008/0151786 A1 | 6/2008 | Li et al. |
| 2012/0058721 A1* | 3/2012 | Fok .................. H04L 67/06 |
| | | 455/41.1 |
| 2016/0205341 A1* | 7/2016 | Hollander ............. H04N 7/015 |
| | | 375/240.08 |
| 2018/0376125 A1* | 12/2018 | Wang .................. H04N 13/161 |

FOREIGN PATENT DOCUMENTS

| | | |
|---|---|---|
| JP | 10-207684 A | 8/1998 |
| JP | 11-25016 A | 1/1999 |
| JP | 2016-25633 A | 2/2016 |
| JP | 2016-505291 A | 2/2016 |

\* cited by examiner

F I G. 1
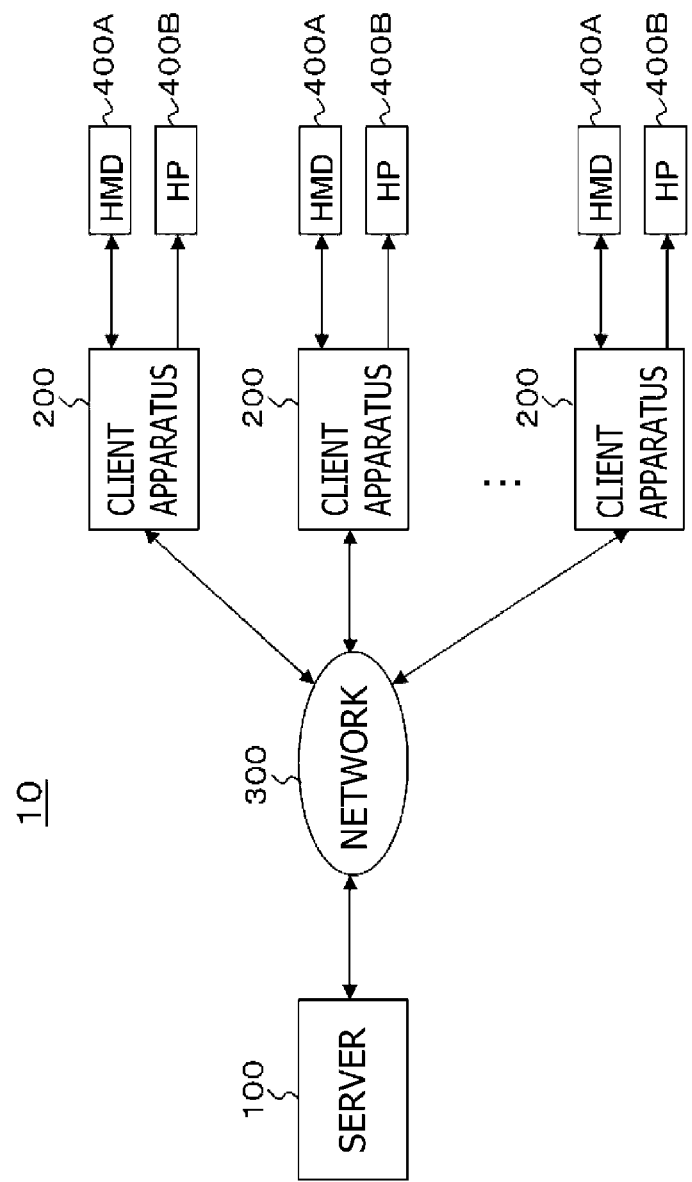

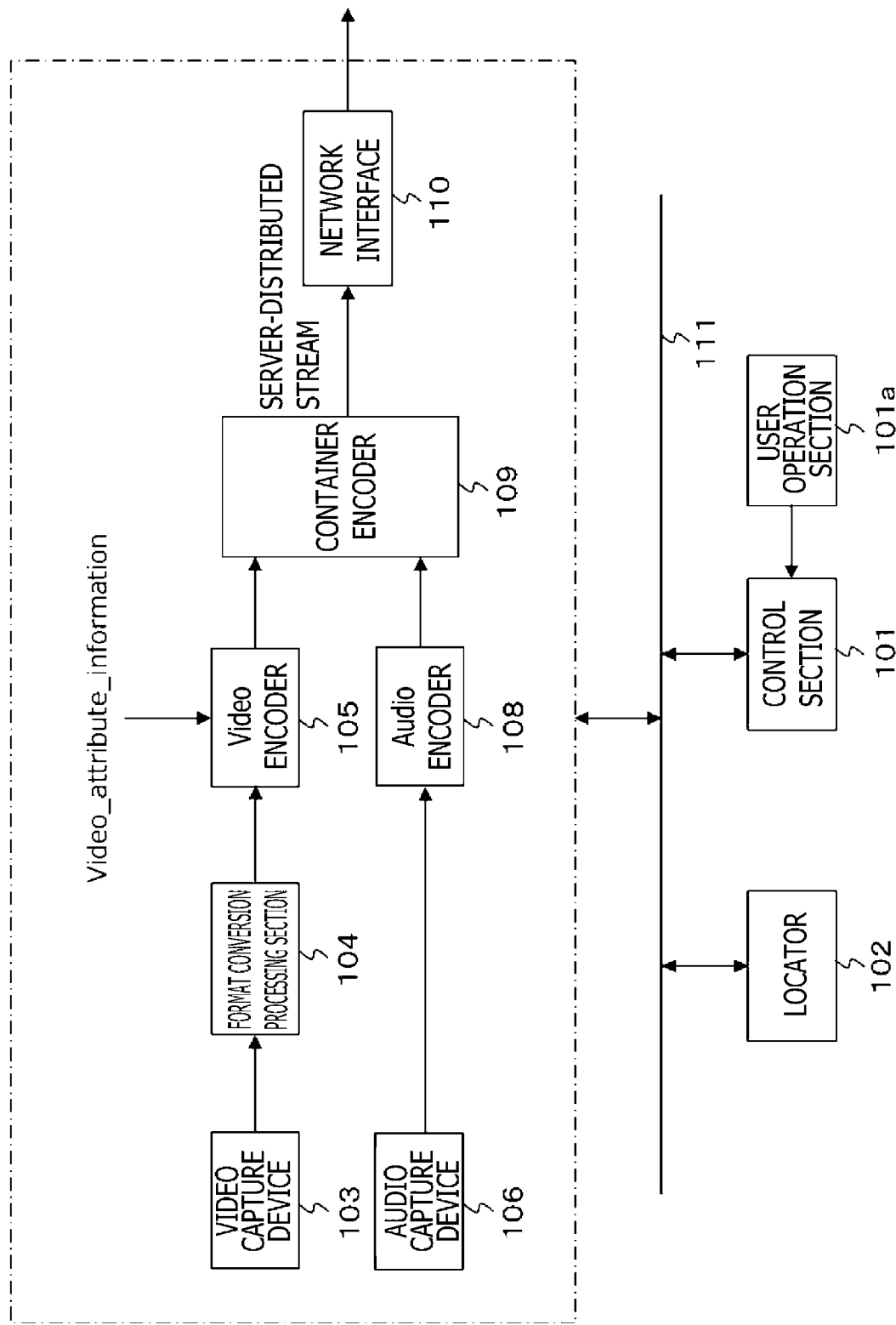

F I G. 4

Video_attribute_information SEI

| Syntax | Size | Type |
|---|---|---|
| Video_attribute_information (){ | | |
|   message_id | 8 | uimsbf |
|   byte_length | 8 | uimsbf |
|   target_content_id | 8 | uimsbf |
|   capture_position(){ | | |
|     position_latitude | 16 | uimsbf |
|     position_longitude | 16 | uimsbf |
|     position_elevation | 16 | uimsbf |
|   } | | |
|   camera_direction | 16 | uimsbf |
|   camera_v_angle | 16 | simsbf |
|   sy_window(){ | | |
|     sy_window_x_start | 16 | uimsbf |
|     sy_window_y_start | 16 | uimsbf |
|     sy_window_x_end | 16 | uimsbf |
|     sy_window_y_end | 16 | uimsbf |
|   } | | |
| } | | |

FIG. 5

Video_attribute_information

| | |
|---|---|
| target_content_id (8bits) | IDENTIFICATION INFORMATION IDENTIFYING VIDEO CONTENT |
| position_latitude (16bits) | INDICATES CAPTURE POSITION (LATITUDE) |
| position_longitude (16bits) | INDICATES CAPTURE POSITION (LONGITUDE) |
| position_elevation (16bits) | INDICATES CAPTURE POSITION (ELEVATION) |
| camera_direction (16bits) | INDICATES DIRECTION OF CAMERA AT TIME OF CAPTURE |
| camera_V_angle (16bits) | INDICATES ANGLE OF CAMERA RELATIVE TO HORIZONTAL DIRECTION AT TIME OF CAPTURE |
| sy_window_x_start (16bits) | START POSITION OF ALLOWABLE SYNTHESIS RANGE (HORIZONTAL POSITION) |
| sy_window_y_start (16bits) | START POSITION OF ALLOWABLE SYNTHESIS RANGE (VERTICAL POSITION) |
| sy_window_x_end (16bits) | END POSITION OF ALLOWABLE SYNTHESIS RANGE (HORIZONTAL POSITION) |
| sy_window_y_end (16bits) | END POSITION OF ALLOWABLE SYNTHESIS RANGE (VERTICAL POSITION) |

FIG. 6
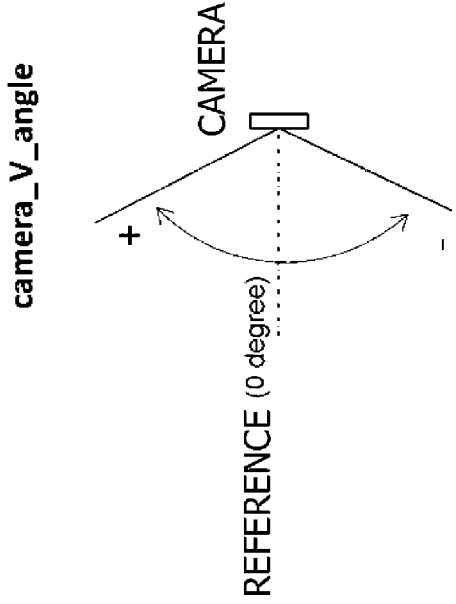
(a)
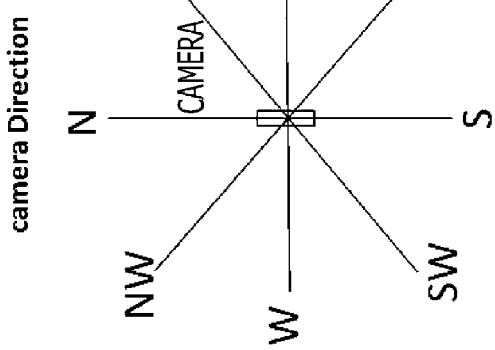
(b)

FIG. 7

```
Box Type: 'vaib'
Container: User data box ('udta')

aligned(8) class VideoAttributeInformationBox
extends FullBox('vaib', version = 0, 0) {
unsigned int(16)
 position_latitude;
 position_longitude;
 position_elevation;
 camera_direction;
 camera_V_angle;
 sy_window_x_start;
 sy_window_y_start;
 sy_window_x_end;
 sy_window_y_end;
}
```

FIG. 9

AVATAR RENDERING CONTROL INFORMATION (a)

| Syntax | Size | Type |
|---|---|---|
| avatar_rendering_control(){ | | |
|   message_id | 8 | uimsbf |
|   byte_length | 8 | uimsbf |
|   client_id | 8 | uimsbf |
|   target_content_id | 8 | uimsbf |
|   number_of_client_objects | 8 | uimsbf |
|   for ( i = 0; i < number_of_client_objects ; i++ ){ | | |
|     client_object_id | 8 | uimsbf |
|     avatar_center_position_x | 16 | uimsbf |
|     avatar_center_position_y | 16 | uimsbf |
|     avatar_rendering_size | 16 | uimsbf |
|   } | | |
| } | | |

(b)

| | |
|---|---|
| message_id (8bits) | IDENTIFICATION INFORMATION IDENTIFYING AVATAR RENDERING CONTROL INFORMATION |
| client_id (8bits) | IDENTIFICATION INFORMATION IDENTIFYING TRANSMITTING CLIENT |
| target_content_id (8bits) | IDENTIFICATION INFORMATION IDENTIFYING VIDEO CONTENT TARGETED FOR SYNTHESIS |
| number_of_client_objects (8bits) | NUMBER OF OBJECTS TRANSMITTED FROM CLIENTS |
| client_object_id (8bits) | IDENTIFICATION INFORMATION IDENTIFYING OBJECT TRANSMITTED FROM CLIENT |
| avatar_center_position_x (16bits) | HORIZONTAL POSITION AT WHICH AVATAR IS SYNTHESIZED IN ALLOWABLE SYNTHESIS RANGE |
| avatar_center_position_y (16bits) | VERTICAL POSITION AT WHICH AVATAR IS SYNTHESIZED IN ALLOWABLE SYNTHESIS RANGE |
| avatar_rendering_size (16bits) | SIZE OF AVATAR TO BE SYNTHESIZED |

FIG. 10

AVATAR DATABASE SELECTION INFORMATION (a)

| Syntax | Size | Type |
|---|---|---|
| avatar_database_selection(){ | | |
|   message_id | 8 | uimsbf |
|   byte_length | 8 | uimsbf |
|   client_id | 8 | uimsbf |
|   target_content_id | 8 | uimsbf |
|   number_of_client_objects | 8 | uimsbf |
|   for ( I = 0; I < number_of_client_objects ; i++ ){ | | |
|     client_object_id | 8 | uimsbf |
|     body_type | 16 | uimsbf |
|     body_angle | 16 | uimsbf |
|     emotional_type | 16 | uimsbf |
|     face_angle | 16 | uimsbf |
|   } | | |
| } | | |

(b)

| | |
|---|---|
| message_id (8bits) | IDENTIFICATION INFORMATION IDENTIFYING AVATAR DATABASE SELECTION INFORMATION |
| client_id (8bits) | IDENTIFICATION INFORMATION IDENTIFYING TRANSMITTING CLIENT |
| target_content_id (8bits) | IDENTIFICATION INFORMATION IDENTIFYING VIDEO CONTENT TARGETED FOR SYNTHESIS |
| number_of_client_objects (8bits) | NUMBER OF OBJECTS TRANSMITTED FROM CLIENTS |
| client_object_id (8bits) | IDENTIFICATION INFORMATION IDENTIFYING OBJECT TRANSMITTED FROM CLIENT |
| body_type (8bits) | ENTIRE BODY TYPE OF AVATAR |
| body_angle (16bits) | ANGLE OF AVATAR ORIENTED RELATIVE TO FRONT |
| emotional_type (16bits) | TYPE OF FACIAL EXPRESSION OR EMOTION OF AVATAR |
| face_angle (16bits) | FACE ANGLE OF AVATAR |

FIG. 11

VOICE OBJECT RENDERING INFORMATION (a)

| Syntax | Size | Type |
|---|---|---|
| Voice_object_rendering_information(){ | | |
|   message_id | 8 | uimsbf |
|   byte_length | 8 | uimsbf |
|   client_id | 8 | uimsbf |
|   target_content_id | 8 | uimsbf |
|   number_of_client_objects | | |
|   for ( I = 0; I < number_of_client_objects ; i++ ){ | | |
|     client_object_id | 8 | uimsbf |
|     Azimuth | 16 | uimsbf |
|     Radius | 16 | uimsbf |
|     Elevation | 16 | uimsbf |
|   } | | |
| } | | |

(b)

message_id (8bits) : IDENTIFICATION INFORMATION IDENTIFYING AVATAR DATABASE SELECTION INFORMATION
client_id (8bits) : IDENTIFICATION INFORMATION IDENTIFYING TRANSMITTING CLIENT
target_content_id (8bits) : IDENTIFICATION INFORMATION IDENTIFYING VIDEO CONTENT TARGETED FOR SYNTHESIS
number_of_client_objects (8bits) : NUMBER OF OBJECTS TRANSMITTED FROM CLIENTS
client_object_id (8bits) : IDENTIFICATION INFORMATION IDENTIFYING OBJECT TRANSMITTED FROM CLIENT
Azimuth (16bits) : AZIMUTH AS POSITION INFORMATION ABOUT AVATAR (OBJECT)
Radius (16bits) : RADIUS AS POSITION INFORMATION ABOUT AVATAR (OBJECT)
Elevation (16bits) : ELEVATION AS POSITION INFORMATION ABOUT AVATAR (OBJECT)

FIG. 13

TTML STRUCTURE

```
<tt xml:lang="" xmlns="http://www.w3.org/ns/ttml">
  <head>
    <metadata/>
    <styling/>
    <layout/>
  </head>
  <body/>
</tt>
```

(a)

```
<metadata xmlns:ttm="http://www.w3.org/ns/ttml#metadata">
  <ttm:title>Timed Text TTML Example</ttm:title>
  <ttm:copyright>The Authors (c) 2006</ttm:copyright>
  <ttavt:synthetic> target_content_id
                    client_id
                    client_object_id
  </ttavt:synthetic>
</metadata>
```

(b)

```
<layout xmlns:tts="http://www.w3.org/ns/ttml#layout">
  <region xml:id
    style="s1"
    tts:extent="560px 62px"
    tts:padding="5px 3px"
    tts:backgroundColor="black"
    <ttavt:synthetic> target_content_id
                      client_id
                      client_object_id
    </ttavt:synthetic>
  />
</layout>
```

TYPICAL LIST OF AVATAR DATABASE

| PORTION | STATE | VALUE |
|---|---|---|
| body_type | | |
| | STANDING UPRIGHT | |
| | SITTING | |
| | LYING | |
| body_angle | | |
| | FACING FORWARD | |
| | FACING BACKWARD | |
| | FACING RIGHT | |
| | FACING LEFT | |
| | FACING UPWARD | |
| | FACING DOWNWARD | |
| emotional_type | | |
| | EXPRESSIONLESS | |
| | SMILING | |
| | CRYING | |
| | ANGRY | |
| face_angle | | |
| | FACING STRAIGHT FORWARD | |
| | DOWNCAST | |

227

CLIENT APPARATUS, CLIENT APPARATUS PROCESSING METHOD, SERVER, AND SERVER PROCESSING METHOD

TECHNICAL FIELD

The present technology relates to a client apparatus, a client apparatus processing method, a server, and a server processing method. More particularly, the technology relates to a client apparatus that performs a process in which a proxy image (or representative image) such as an avatar of each client is synthesized on a background image (or transmitted image that is transmitted) from the server.

BACKGROUND ART

There exist head-mounted displays (HMD) each worn on the head of a user and capable of presenting the user with images using a display part positioned in front of the user's eyes, for example (e.g., see PTL 1). Recent years have witnessed a trend towards the enjoyment by individuals of all-sky-grade images prepared for virtual reality (VR) use on the HMD. Multiple persons each enjoying a personalized VR space may be expected not only to view their VR spaces alone but also to share their own VR spaces for communicating with one another.

CITATION LIST

Patent Literature

PTL 1: JP 2016-025633A

SUMMARY OF INVENTION

Technical Problem

An objective of the present technology is to allow multiple clients (viewers) to share their VR spaces for communicating with one another.

Solution to Problem

According to one concept of the present technology, there is provided a client apparatus including:

a reception section configured to receive from a server a server-distributed stream including a video stream obtained by encoding a background image, the receiving section further receiving from another client apparatus a client-transmitted stream including proxy image meta information for displaying a proxy image of the other client; and a control section configured to control a decoding process of decoding the video stream to obtain the background image, a proxy image data generation process of generating the proxy image on the basis of the proxy image meta information, and an image data synthesis process of synthesizing the proxy image on the background image.

With the present technology, the reception section receives from the server the server-distributed stream including the video stream obtained by encoding the background image, the receiving section further receiving from another client apparatus a client-transmitted stream including the proxy image meta information for displaying the proxy image of the other client. The proxy image is an avatar or a symbol recognizable as a character, for example.

The control section, or controller such as a computer processor, controls the decoding process, proxy image data generation process, and image data synthesis process. The decoding process involves decoding the video stream to obtain the background image. The proxy image data generation process involves generating the proxy image on the basis of the proxy image meta information. The image data synthesis process involves synthesizing the proxy image on the background image.

For example, information indicating an allowable synthesis range for the proxy image in the background image may be inserted in a layer of the video stream and/or in a layer of the server-distributed stream. On the basis of the information indicating the allowable synthesis range, the control section may control the synthesis process in such a manner that the proxy image is placed inside the allowable synthesis range in the background image.

In this case, the proxy image meta information may include synthesis position information indicating a synthesis position in the allowable synthesis range for the proxy image. The control section may control the synthesis process in such a manner that the proxy image is synthesized at the synthesis position indicated by the synthesis position information. Also in this case, for example, the proxy image meta information may include size information indicating a size of the proxy image. The control section may control the synthesis process in such a manner that the proxy image is synthesized on the background image as per the size indicated by the size information.

With the present technology, as outlined above, the proxy image is generated in the background image on the basis of the proxy image meta information. The proxy image is synthesized on the background image. This allows each client to recognize the proxy image of another client being synthesized on a common background image. The clients may thus share their VR spaces for agreeably communicating with one another.

Note that, according to the present technology, for example, the client-transmitted stream may include audio data corresponding to the proxy image meta information together with object metadata. The control section may further perform an audio output process in which a rendering process corresponding to the object metadata is carried out on the audio data to obtain audio output data of which a sound image position coincides with the synthesis position of the proxy image. This allows each client to recognize as if each proxy image at its synthesis position in the background image emits voice of the client represented by the proxy image.

Also with the present technology, for example, the client-transmitted stream may include subtitle (or text) data corresponding to the proxy image meta information together with display position information. The control section may further control a subtitle synthesis process to synthesize, on the background image, subtitle display data on the basis of the display position information in such a manner that subtitles represented by the subtitle data are displayed at a position corresponding to the synthesis position of the proxy image. This allows each client to recognize the subtitles from the proxy image of another client at a position corresponding to the synthesis position of the proxy image of the other client in the background image.

Also with the present technology, for example, the client apparatus may further include a transmission section configured to transmit to another client apparatus a client-transmitted stream including proxy image meta information for displaying a proxy image of the own client. The proxy image data generation process may further generate the proxy image of the own client on the basis of the proxy image meta information for displaying the proxy image of the own client. This makes it possible to synthesize not only the proxy image of the other client but also the proxy image of the own client on the background image.

Also with the present technology, for example, the background image may be a wide viewing angle image, where the wide viewing angle is at a 180 degree, or larger, image. The control section may further control an image clipping process of clipping a portion of the background image to obtain display image data. For example, the image derived from the display image data may be displayed on the HMD, with the clipping range determined by the attitude of the head detected by sensors mounted on the HMD.

Further, according to another concept of the present technology, there is provided a server including:

an imaging section configured to image a subject to obtain a background image;

and a transmission section configured to transmit to a client apparatus a server-distributed stream including a video stream obtained by encoding the background image;

in which information indicating an allowable synthesis range for a proxy image in the background image is inserted in a layer of the video stream and/or in a layer of the server-distributed stream.

With the present technology, the imaging section images a subject to obtain the background image. The background image may be the image data of a wide viewing angle image, for example. The transmission section transmits to a client apparatus the server-distributed stream including the video stream obtained by encoding the background image. In this configuration, the information indicating the allowable synthesis range for a proxy image in the background image is inserted in a layer of the video stream and/or in a layer of the server-distributed stream.

According to the present technology, as outlined above, the information indicating the allowable synthesis range for the proxy image in the background image is inserted in a layer of the video stream and/or in a layer of the server-distributed stream when transmitted. This makes it easy for the client apparatus to place the proxy image of each client in the background image within a range intended by the server on the basis of the information indicating the allowable synthesis range.

Advantageous Effects of Invention

The present technology allows multiple clients to share their own VR spaces for communication with one another. Note that the advantageous effects outlined above are not limitative of the present disclosure. Further advantages of the disclosure will become apparent from the ensuing description.

BRIEF DESCRIPTION OF DRAWINGS

FIG. 1 is a block diagram depicting a typical configuration of a space-sharing display system embodying the present technology.

FIG. 3 is a block diagram depicting a typical configuration of the server.

FIG. 4 is a tabular diagram depicting a typical structure of a video attribute information SEI message.

FIG. 5 is a tabular diagram depicting the content of major information in the typical structure of the video attribute information SEI message.

FIG. 6 is a set of schematic diagrams explaining information about camera status.

FIG. 7 is a tabular diagram depicting typical information held in a video attribute information box.

FIG. 9 is a set of tabular diagrams depicting a typical structure of avatar rendering control information and the content of major information in that typical structure.

FIG. 10 is a set of tabular diagrams depicting a typical structure of avatar database selection information and the content of major information in that typical structure.

FIG. 11 is a set of tabular diagrams depicting a typical structure of voice object rendering information as object metadata about each object and the content of major information in that typical structure.

FIG. 13 is a set of tabular diagrams explaining a TTML structure and a typical structure of metadata.

FIG. 17 is a tabular diagram depicting a typical list of an avatar database.

DESCRIPTION OF EMBODIMENT

Figure 2:
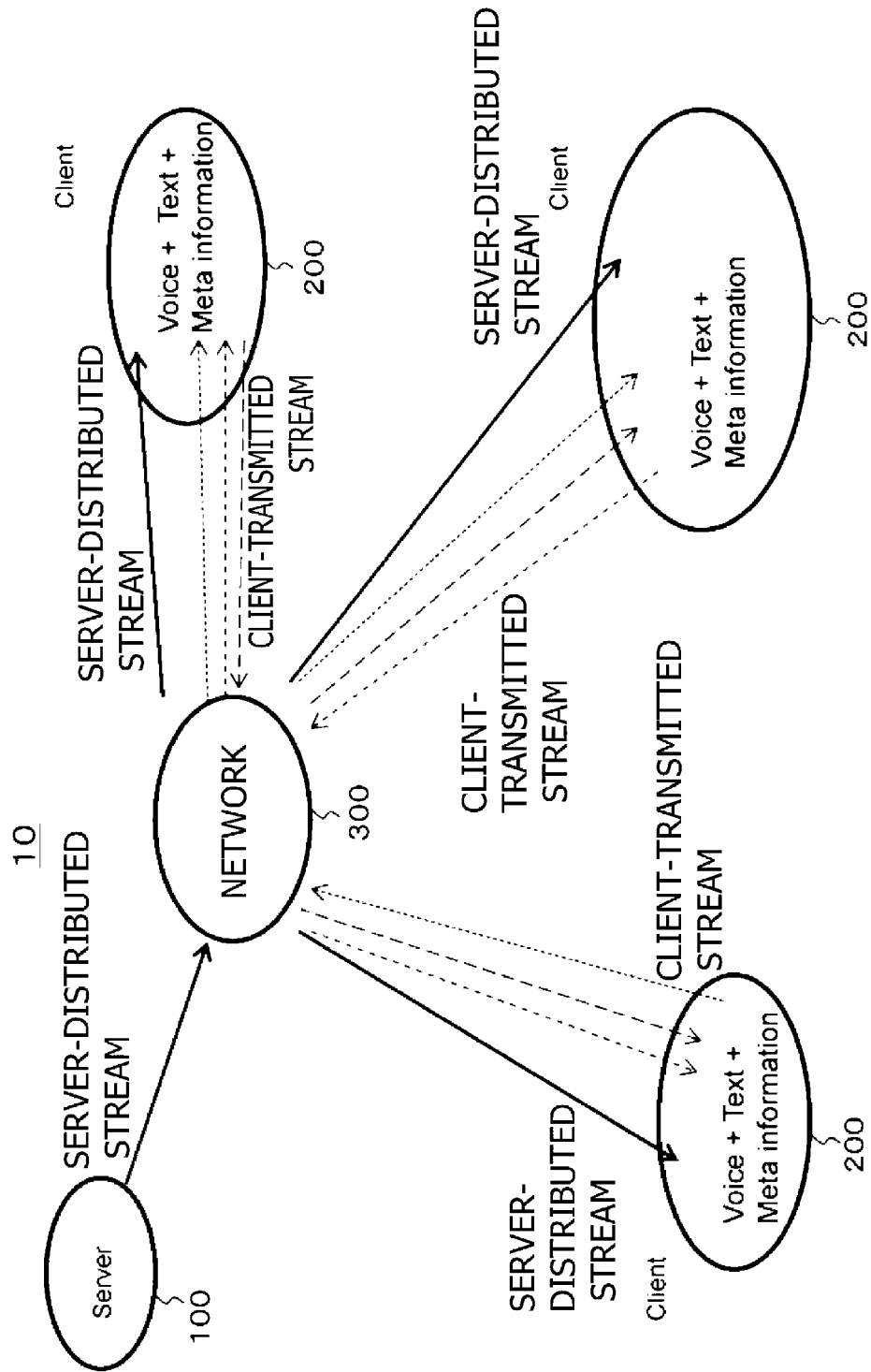
FIG. 2 is a schematic diagram depicting typical relations between a server and multiple client apparatuses transmitting and receiving streams therebetween.

Described below is the preferred mode for implementing the present invention (called the embodiment hereunder). Note that the description will be given under the following headings:

1. Embodiment
2. Variations

1. Embodiment

Space-Sharing Display System

FIG. 1 depicts a typical configuration of a space-sharing display system 10 embodying the present technology. The space-sharing display system 10 is configured with a server 100 connected with multiple client apparatuses 200 via a network 300 such as the Internet.

The server 100 transmits to each client apparatus 200 a server-distributed stream including a video stream obtained by encoding a background image acquired by capturing a subject, the stream being transmitted via the network 300. For example, the image data of the background image is the image data of a wide viewing angle image, such as 180 degrees or more. Information indicating an allowable synthesis range for a proxy image in the background image is inserted in a layer of the video stream and/or in a layer of the server-distributed stream (container). The proxy image is an avatar or a symbol recognizable as a character, for example. For this embodiment, avatars are assumed to be the proxy image. The ensuing description will be made on the assumption that the proxy image is an avatar.

The client apparatus 200 receives the server-distributed stream transmitted from the server 100 over the network 300. The client apparatus 200 obtains the background image by decoding the video stream included in the server-distributed stream. Also, the client apparatus 200 receives from another client apparatus 200 a client-transmitted frame (container) including avatar meta information for displaying the avatar of the other client, the frame being transmitted via the network 300.

The client apparatus 200 generates the image data of the avatar on the basis of the avatar meta information, and synthesizes the avatar image data on the background image data. In this case, the client apparatus 200 places the avatar within the allowable synthesis range of the background image on the basis of information indicative of the allowable synthesis range for avatars in the background image, the information being inserted in a layer of the video stream and/or in a layer of the server-distributed stream.

The avatar meta information includes synthesis position information indicating the synthesis position in the allowable synthesis range for avatars. The client apparatus 200 synthesizes the avatar at the synthesis position indicated by the synthesis position information. Also, the avatar meta information includes size information indicative of an avatar size. The client apparatus 200 synthesizes the avatar on the background image as per the size indicated by the size information.

The client apparatus 200 further transmits a client-transmitted stream (container) including the avatar meta information for displaying the own avatar to the other client apparatuses 200 via the network 300. In this case, the client apparatus 200 generates the image data of its own avatar on the basis of the avatar meta information for displaying the own avatar, and synthesizes the avatar image data on the image data of the background image data.

Note that, presumably, some client apparatuses 200 may not have the capability to transmit to the other client apparatuses 200 a client-transmitted stream (container) including the avatar meta information for displaying the own avatar.

If the image data of the background image is the image data of an ordinary viewing angle image, the client apparatus 200 transmits the image data of the background image on which the avatar image data is synthesized as unmodified display image data to an HMD 400A serving as a display device. On the other hand, if the image data of the background image is the image data of a wide viewing angle image, the client apparatus 200 obtains display image data by clipping a portion of the image data of the background image on which the avatar image data is synthesized, and transmits the obtained display image data to the HMD 400A serving as the display device. In this case, the clipping range is determined in accordance with the attitude of the head detected by sensors mounted on the HMD, for example.

Further, the client-transmitted stream from another client apparatus 200 includes audio data corresponding to the avatar meta information together with object metadata. Further, there also exists, along with the object metadata, audio data corresponding to the avatar meta information for displaying the own avatar. The client apparatus 200 performs a rendering process on the audio data in accordance with the object metadata to obtain audio output data of which the sound image position coincides with the avatar synthesis position. The client apparatus 200 transmits the obtained audio output data to headphones (HP) 400B serving as an audio output device.

The client-transmitted stream from another client apparatus 200 also includes subtitle data corresponding to the avatar meta information together with display position information. There also exists, along with the display position information, subtitle data corresponding to the avatar meta information for displaying the own avatar. The client apparatus 200 synthesizes subtitle display data on the image data of the background image in accordance with the display position information in such a manner that the subtitles on the basis of the subtitle data are displayed at the position corresponding to the synthesis position of the avatar.

FIG. 2 depicts typical relations between the server 100 and multiple client apparatuses 200 transmitting and receiving streams therebetween. Note that, in this illustrated example, there are three client apparatuses 200, with every client apparatus 200 transmitting a client-transmitted frame to the other client apparatuses 200. The client-transmitted frame includes avatar meta information, voice data, and text data (subtitle data).

Configuration of the Server

FIG. 3 depicts a typical configuration of the server 100. The server 100 includes a control section 101, a locator 102, a video capture device 103, a format conversion processing section 104, a video encoder 105, an audio capture device 106, an audio encoder 108, a container encoder 109, and a network interface 110. These components are interconnected via a bus 111.

The control section 101 controls the operations of the respective components in the server 100. The control section 101 is connected with a user operation section 101a. The locator 101 receives radio waves from GPS satellites to obtain position information (longitude, latitude and elevation). The video capture device 103 is a camera (imaging section) that images a subject and obtains image data of a background image. The video capture device 103 acquires wide viewing angle image data or image data of multiple images for obtaining the wide viewing angle image data. The format conversion processing section 104 performs mapping processes (e.g., deforming of wide viewing angle image, synthesizing of multiple images, etc.) on the image data obtained by the video capture device 103, thereby acquiring the image data in an image format for input to the encoders.

The video encoder 105 obtains encoded image data by performing an encoding process such as HEVC on the image data acquired by the format conversion processing section 104. The video encoder 105 then generates a video stream that includes the encoded image data. In this case, the video encoder 105 places a video attribute information SEI message (Video attribute_information SEI message) in an SEI message group "SEIs" for an access unit (AU).

Inserted in the SEI message are capture information indicating the capture status of the camera (imaging section), position information (GPS data) indicating the camera position (capture position), and information indicating the allowable synthesis range for avatars in the background image.

FIG. 4 depicts a typical structure (syntax) of the video attribute_information SEI message. FIG. 5 depicts the content (semantics) of major information in that typical structure. An eight-bit field "message_id" indicates identification information identifying the video attribute_information SEI message. An eight-bit field "byte_length" indicates the number of subsequent bytes as the size of this video attribute_information SEI message.

An eight-bit field "target_content_id" indicates identification information identifying video content. A field "capture_position( )" indicates a capture position. A 16-bit field "position_latitude" indicates the capture position (in latitude). A 16-bit field "position_longitude" indicates the capture position (in longitude). A 16-bit field "position_elevation" indicates the capture position (in elevation).

A 16-bit field "camera_direction" indicates the direction in which the camera is oriented at the time of capture. For example, as depicted in Subfigure (a) of FIG. 6, this field indicates the direction such as east, west, north, or south in which the camera is oriented. A 16-bit field "camera_V_angle" indicates the angle of the camera relative to the horizontal direction at the time of capture, as depicted in Subfigure (b) of FIG. 6.

A field "sy_window( )" indicates the allowable synthesis range for avatars in the background image. A 16-bit field "sy_window_x_start" indicates the start position of the allowable synthesis range (horizontal position). A 16-bit field "sy_window_y_start" indicates the start position of the allowable synthesis range (vertical position). A 16-bit field "sy_window_x_end" indicates the end position of the allowable synthesis range (horizontal position). A 16-bit field "sy_window_y_end" indicates the end position of the allowable synthesis range (vertical position).

Returning to FIG. 3, the audio capture device 106 is a microphone that captures the voice (audio) corresponding to the subject imaged by the video capture device 103 so as to obtain audio data of at least two channels, such as 5.1-channel audio data. The audio encoder 108 performs an encoding process such as MPEG-H Audio or AC4 on the audio data obtained by the audio capture device 106 so as to generate an audio data stream.

The container encoder 109 generates as a server-distributed stream a container that includes the video stream obtained by the video encoder 105 and the audio stream acquired by the audio encoder 108, the container being an MP4 stream in this example.

In that case, the container encoder 109 defines a video attribute_information box ("vaib" box) in an "udta" box defined in an initialization segment (IS) or in a "moof" box.

As with the SEI message, inserted in the video attribute information box are the capture information indicating the capture status of the camera (imaging section), position information (GPS data) indicating the camera position (capture position), and information indicating the allowable synthesis range for avatars in the background image. Note that it is not mandatory to insert both the video attribute information box and the video attribute information SEI message in the video attribute information box; only either of the two may be inserted instead.

FIG. 7 depicts typical information held in the "vaib" box. A field "position_latitude" stands for the capture position (in latitude), "position_longitude" for the capture position (in longitude), and "position_elevation" for the capture position (in elevation). Further, a field "camera_direction" indicates the direction in which the camera is oriented at the time of capture, the direction being relative to the north. Further, a field "camera_V_angle" indicates the angle of the camera relative to the horizontal direction at the time of capture. Further, a field "sy_window_x_start" stands for the start position (horizontal position) of the allowable synthesis range, "sy_window_y_start" for the start position (vertical position) of the allowable synthesis range, "sy_window_x_end" for the end position (horizontal position) of the allowable synthesis range, and "sy_window_y_end" for the end position (vertical position) of the allowable synthesis range.

Returning to FIG. 3, the network interface 110 communicates with the client apparatuses 200 via the network 300. The network interface 110 transmits the server-distributed stream obtained by the container encoder 109 to the client apparatuses 200 via the network 300.

What follows is a brief explanation of the operation of the server 100 depicted in FIG. 3. The video capture device 103 images the subject to obtain wide viewing angle image data or image data of multiple images for acquiring wide viewing angle image data. The image data obtained by the video capture device 103 is supplied to the format conversion processing section 104. The format conversion processing section 104 performs mapping processes (e.g., deforming of wide viewing angle image, synthesizing of multiple images, etc.) on the image data supplied from the video capture device 103 so as to acquire the image data in an image format for input to the encoders.

The image data obtained by the format conversion processing section 104 is supplied to the video encoder 105. The video encoder 105 obtains encoded image data by performing an encoding process such as HEVC on the image data from the format conversion processing section 104. The video encoder 105 thus generates a video stream that includes the encoded image data.

Further, the video encoder 105 places a video attribute information SEI message (see FIG. 4) in the SEI message group "SEIs" for the access unit (AU). Inserted in the SEI message are the capture information indicating the capture status of the camera (imaging section), position information (GPS data) indicating the camera position (capture position), and information indicating the allowable synthesis range for avatars in the background image.

The audio capture device 106 captures the voice (audio) corresponding to the subject imaged by the video capture device 103 so as to obtain audio data of at least two channels. The audio data of each channel is supplied to the audio encoder 108. The audio encoder 108 performs an encoding process such as MPEG-H Audio or AC4 on the audio data obtained by the audio capture device 106 in order to generate an audio data stream.

The video stream obtained by the video encoder 105 and the audio stream acquired by the audio encoder 108 are supplied to the container decoder 109. The container encoder 109 generates a container including the video stream and the audio stream as a server-distributed stream, which is an MP4 stream in this case.

Further, the container encoder 109 newly defines a video attribute information box (see FIG. 7) in the "udta" box defined in the initialization section (IS) or in the "moof" box. Inserted in the newly defined box are the capture information indicating the capture status of the camera (imaging section), position information (GPS data) indicating the camera position (capture position), and information indicating the allowable synthesis range for avatars in the background image.

The server-distributed stream obtained by the container encoder 109 is supplied to the network interface 110. The network interface 110 transmits the server-distributed stream to the client apparatuses 200 via the network 300.

Configuration of the Client Apparatus

Figure 8:
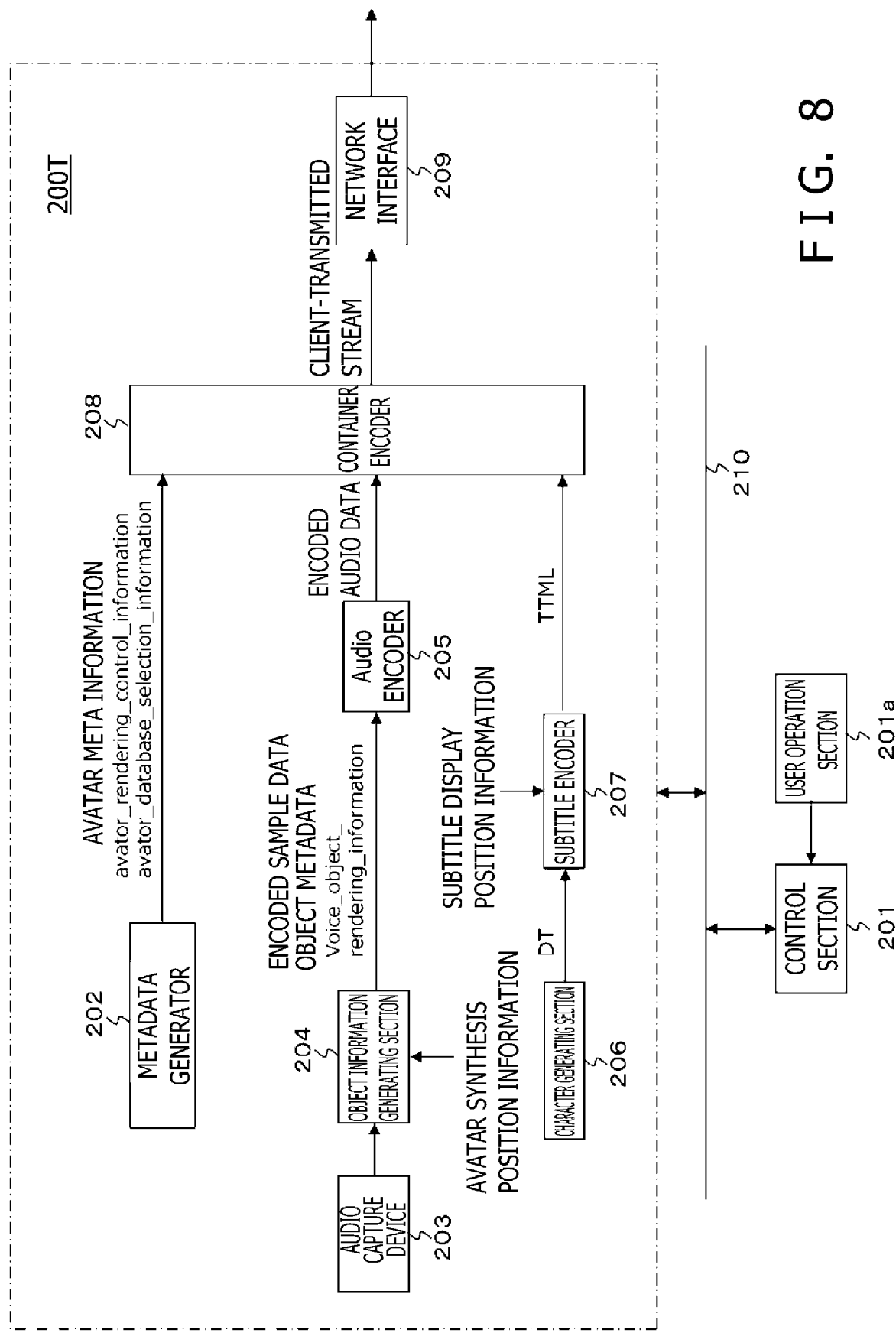
FIG. 8 is a block diagram depicting a typical configuration of the transmission system of a client apparatus.

A typical configuration of the client apparatus 200 is explained below. FIG. 8 depicts a typical configuration of a transmission system 200T of the client apparatus 200. The transmission system 200T includes a control section 201, a metadata generator 202, an audio capture device 203, an object information generating section 204, an audio encoder 205, a character generating section 206, a subtitle encoder 207, a container encoder 208, and a network interface 209. These components are interconnected via a bus 210.

The control section 201 controls the client apparatus 200, i.e., the respective components of the transmission system 200T. The control section 201 is connected with a user operation section 201a. In accordance with a user's operations on the user operation section 201a, the metadata generator 202 generates avatar meta information. The avatar meta information includes avatar rendering control information (avator_rendering_control_information) and avatar database selection information (avator_database_selection).

The avatar rendering control information includes information indicating the synthesis position for avatars in the allowable synthesis range of the background image, and information indicating the size of the avatar. Subfigure (a) in FIG. 9 indicates a typical structure (syntax) of the avatar rendering control information, and Subfigure (b) in FIG. 9 depicts the content (semantics) of major information in that typical structure.

An eight-bit field "message_id" indicates identification information identifying the avatar rendering control information. An eight-bit field "byte_length" indicates the number of subsequent bytes as the size of this avatar rendering control information.

An eight-bit field "client_id" indicates identification information identifying the client (client apparatus 200) transmitting this avatar meta information. An eight-bit field "target_content_id" indicates identification information identifying the video content (background image) targeted for synthesis. An eight-bit field "number_of_client_objects" indicates the number of objects, i.e., the number of avatars, transmitted from the clients.

There exist as many "client_object_id" fields, "avator_center_position_x" fields, "avator_center_position_y" fields, and "avator_rendering_size" fields each as the number of objects. The eight-bit field "client_object_id" indicates identification information identifying the object (avatar) transmitted from the client.

The 16-bit field "avator_center_position_x" indicates the x-coordinate (horizontal position) of the center coordinates representing the avatar synthesis position in the allowable synthesis range (sy_window). The 16-bit field "avator_center_position_y" indicates the y-coordinate (vertical position) of the center coordinates representing the avatar synthesis position in the allowable synthesis range (sy_window). The 16-bit field "avator_rendering_size" indicates the dimensions (i.e., size) of the avatar to be synthesized. Note that the size is obtained using the diagonal line of a rectangle starting from the center coordinates of the avatar synthesis position. With the original aspect ratio of the avatar image in the database kept intact, the size is converted in a manner proportionate with the size of the avatar to be synthesized.

The avatar database selection information includes selection information for obtaining the avatar image data from the avatar database. Subfigure (a) in FIG. 10 depicts a typical structure (syntax) of the avatar database selection information, and Subfigure (b) in FIG. 10 depicts the content (semantics) of major information in that typical structure.

An eight-bit field "message_id" indicates identification information identifying the avatar database selection information. An eight-bit field "byte_length" indicates the number of subsequent bytes representing the size of the avatar database selection information. An eight-bit field "client_id" indicates identification information identifying the client (client apparatus 200) transmitting this avatar database selection information. An eight-bit field "target_content_id" indicates identification information identifying the video content (background image) targeted for synthesis.

An eight-bit field "number_of_client_objects" indicates the number of objects transmitted from the clients, i.e., the number of avatars. There exist as many "client_object_id" fields, "body_type" fields, "body_angle" fields, "emotional_type" fields, and "face_angle" fields each as the number of objects. The eight-bit field "client_object_id" indicates identification information identifying the object (avatar) transmitted from the client.

The 16-bit field "body_type" indicates the entire body type of the avatar. The 16-bit field "body_angle" indicates the angle attribute of the avatar image oriented relative to the front. The 16-bit field "emotional_type" indicates the type of the facial expression or emotion of the avatar. The 16-bit field "face_angle" indicates the face angle of the avatar.

Returning to FIG. 8, the audio capture device 203 is a microphone that captures the voice (audio) of each object, i.e., each avatar, to obtain audio data. The object information generating section 204 generates object metadata about each object on the basis of avatar synthesis position information, so as to output object encoded data about each object (encoded sample data, object metadata).

Subfigure (a) in FIG. 11 depicts a typical structure of voice object rendering information (Voice_object_rendering_information) as the object metadata about each object (avatar), and Subfigure (b) in FIG. 11 depicts the content (semantics) of major information in that typical structure. An eight-bit field "message_id" indicates identification information identifying the voice object rendering information. An eight-bit field "byte_length" indicates the number of subsequent bytes as the size of this avatar database selection information. An eight-bit field "client_id" indicates identification information identifying the client (client apparatus 200) transmitting the audio data. An eight-bit field "target_content_id" indicates identification information identifying the video content (background image) targeted for synthesis.

An eight-bit field "number_of_client_objects" indicates the number of objects transmitted from the clients, i.e., the number of avatars. There exist as many "client_object_id" fields, "Azimuth" fields, "Radius" fields, and "Elevation" fields each as the number of objects. The eight-bit field "client_object_id" indicates identification information identifying the object (avatar) transmitted from the client.

The 16-bit field "Azimuth" indicates the azimuth as position information about the avatar as the object. The 16-bit field "Radius" indicates the radius as another position information about the avatar as the object. The 16-bit field "Elevation" indicates the elevation as another position information about the avatar as the object.

Figure 12:
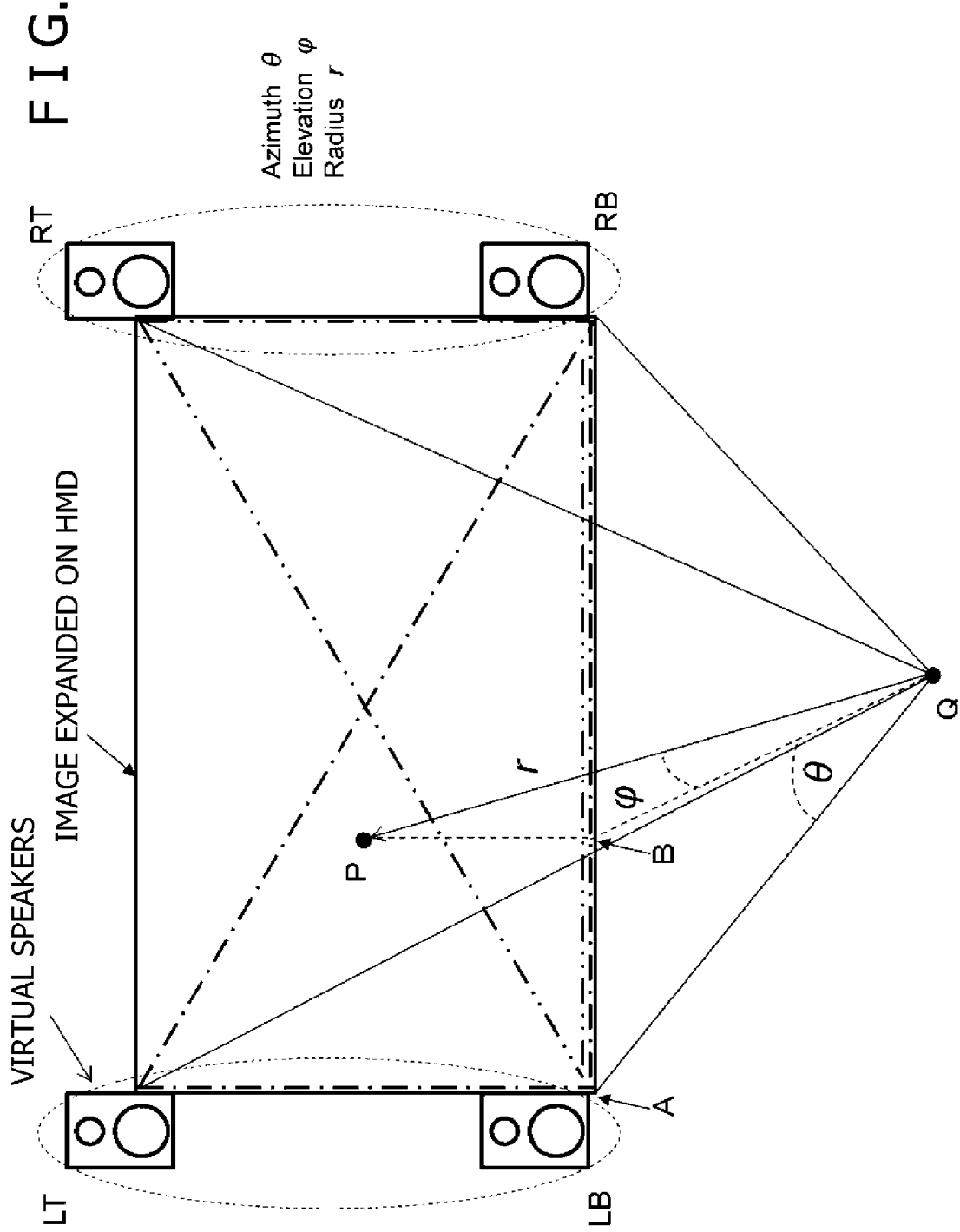
FIG. 12 is a schematic diagram explaining how to obtain values of "azimuth," "radius," and "elevation."

Explained below in reference to FIG. 12 is how to obtain the values of "Azimuth", "Radius", and "Elevation". A point P denotes the center coordinates of the avatar synthesis position in the image expanded on the HMD 400A. As mentioned above, the position where the avatar is synthesized is within the allowable synthesis range for avatars in the background image. The avatar synthesis position is identified by avatar synthesis position information ("avator_center_position_x", "avator_center_position_y").

With this embodiment, the allowable synthesis range for avatars in the background image is set corresponding to the image range expanded on the HMD 400A. This permits identification of the coordinates of the point P in the image expanded on the HMD 400A in accordance with the avatar synthesis position information. Also with this embodiment, in the default display state, the range of the image expanded on the HMD 400A corresponds to the allowable synthesis range for avatars in the background image.

Reference characters LT, LB, RT, and RB denote virtual speakers on a presumed display monitor. Further, a point Q represents the center of a presumed viewing position. If the distance from the point Q to the point P is assumed to be represented by r, the angle between QA and QB by θ, and the angle between QB and QP by φ, then the values of "Azimuth", "Radius", and "Elevation" (avatar position information) are defined as follows:

Azimuth=θ
Elevation=φ
Radium=r.

As discussed above, the values of "Azimuth", "Radius", and "Elevation" as the synthesis position information about the object (avatar) are included in the voice object rendering information (see FIG. 11) when the latter information is transmitted. On the receiving side, these values may be input unmodified to a renderer as the object metadata.

Note that, also on the receiving side, the avatar synthesis position information ("avator_center_position_x", "avator_center_position_y") included in the avatar rendering control information (see FIG. 9) allows the coordinates of the point P to be identified. The point P and the point Q as the center of the presumed viewing position may also be used to obtain the values of "Azimuth", "Radius", and "Elevation" (see FIG. 12). The obtained values may be input to the renderer as the object metadata.

In that case, there is no need to transmit the values of "Azimuth", "Radius", and "Elevation" as the synthesis position information about each object (avatar) using the voice object rendering information (see FIG. 11). For example, the field "number_of_client_objects" is set to 0.

Further, Even in such a case, transmitting the values of "Radius" allows the server 100 to inform the client apparatuses 200 of an appropriate depth position of each object (avatar) at the position where the object is synthesized. In this case, the fields "Azimuth", "Radius", and "Elevation" inserted in the voice object rendering information (see FIG. 11) as the synthesis position information about each object (avatar) are set with invalid values, for example.

Further, even where the value of "Radius" is not transmitted, it is possible, on the side of the client apparatuses 200, to set the appropriate depth position of the synthesis position of each object (avatar) by adjusting the "Radius" obtained value in keeping with the size of the object (avatar) on the basis of the information "avator_rendering_size" included in the avatar rendering control information (see FIG. 9).

Returning to FIG. 8, the audio encoder 205 obtains MPEG-H 3D Audio encoded audio data by encoding the object encoded data (encoded sample data, object metadata) about each object acquired by the object information generating section 107. The encoded audio data constitutes the audio data corresponding to the avatar meta information.

In accordance with the user's operations on the user operation section 201a, the character inputting section 206 generates as needed the subtitle text data (character codes) DT corresponding to each object, i.e., to each avatar. The subtitle encoder 207 receives input of the text data DT to obtain subtitle text information in a predetermined format, which is Timed Text Markup Language (TTML) for this embodiment. The TTML constitutes the subtitle data corresponding to the avatar meta information.

Subfigure (a) in FIG. 13 depicts the TTML structure. The TTML is described on XML basis. The TTML includes a header and a body. The header includes such respective elements as metadata, styling, and layout. The metadata includes metadata title information and copyright information, among others. The styling includes such information as color, font (fontFamily), size (fontSize), and alignment (textAlign) in addition to an identifier (id). The layout includes such information as range (extent), offset (padding), background color (backgroundColor), and alignment (displayAlign), in addition to an identifier (id) identifying the region in which the subtitles are placed. The body includes subtitle text information, among others.

With this embodiment, subtitle object rendering information is inserted in the TTML. Subfigure (b) in FIG. 13 depicts a typical structure of metadata (TTM: TTML Metadata). The structure includes such information as "target_content_id", "client_id", and "client_object_id". The information "target_content_id" indicates identification information identifying the video content (background image) targeted for synthesis. The information "client_id" indicates identification information identifying the client (client apparatus 200) transmitting the subtitle data. The information "client_object_id" indicates identification information identifying the object (avatar) transmitted from the client. Note that the information about the subtitle display position is included in the body.

Returning to FIG. 8, the container encoder 208 generates as a client-transmitted stream a container that includes the avatar meta information generated by the metadata generator 202, 3D Audio encoded audio data generated by the audio encoder 205, and TTML as the subtitle text information obtained by the subtitle encoder 207, the container being an MP4 stream in this case.

The network interface 209 communicates with the other client apparatuses 200 via the network 300. The network interface 209 transmits the client-transmitted stream obtained by the container encoder 208 to the other client apparatuses 200 via the network 300.

What follows is a brief explanation of the operation of the transmission system 200T depicted in FIG. 8. The metadata generator 202 generates avatar meta information in accordance with the user's operations on the user operation section 201a. The avatar meta information includes the avatar rendering control information (see FIG. 9) and the avatar database selection information (see FIG. 10). The avatar rendering control information includes both information indicating the avatar synthesis position in the allowable synthesis range in the background image and information indicating the size of the avatar. Further, the avatar database selection information includes selection information for obtaining the image data of the avatar from an avatar database.

The audio capture device 203 obtains audio data by capturing the voice (audio) of each object, i.e., each avatar. The audio data about each object (avatar) is supplied to the object information generating section 204. The object information generating section 204 is also supplied with the synthesis position information about each object (avatar) in the background image.

The object information generating section 204 generates object metadata about each object on the basis of the object synthesis position information so as to obtain the object encoded data (encoded sample data, object metadata) about each object. The object encoded data includes the voice object rendering information (see FIG. 11) as the object metadata about each object (avatar). The voice object rendering information includes the position information (θ, φ, r) about each object (avatar).

The object encoded data (encoded sample data, object metadata) obtained by the object information generating section 204 about each object is supplied to the audio encoder 205. The audio encoder 205 encodes the object encoded data about each object so as to obtain MPEG-H 3D Audio encoded audio data.

In accordance with the user's operations on the user operation section 201a, the character inputting section 206 generates as needed the subtitle text data (character codes) DT corresponding to each object, i.e., each avatar. The text data DT is supplied to the subtitle encoder 207. The subtitle encoder 207 is also supplied with the display position information about the subtitles corresponding to each object (avatar).

The subtitle encoder 207 obtains TTML as text information about the subtitles on the basis of the text data DT. The rendering information is inserted into the metadata of the TTML, for example (see FIG. 13). Note that the information associated with the display position of the subtitles is included in the head. The avatar rendering information may be included alternatively in the layout under the head, along with such information as "origin" and "extent" other than the metadata.

The container encoder 208 is supplied with the avatar meta information generated by the metadata generator 202, with 3D Audio encoded audio data obtained by the audio encoder 205, and with the TTML as the subtitle text information acquired by the subtitle encoder 207. The container encoder 208 generates as a client-transmitted stream an MP4 stream that includes the avatar meta information, the encoded audio data, and the TTML.

The client-transmitted stream obtained by the container encoder 208 is supplied to the network interface 209. The network interface 209 transmits the client-distributed stream to the other client apparatuses 200 via the network 300.

Figure 14:
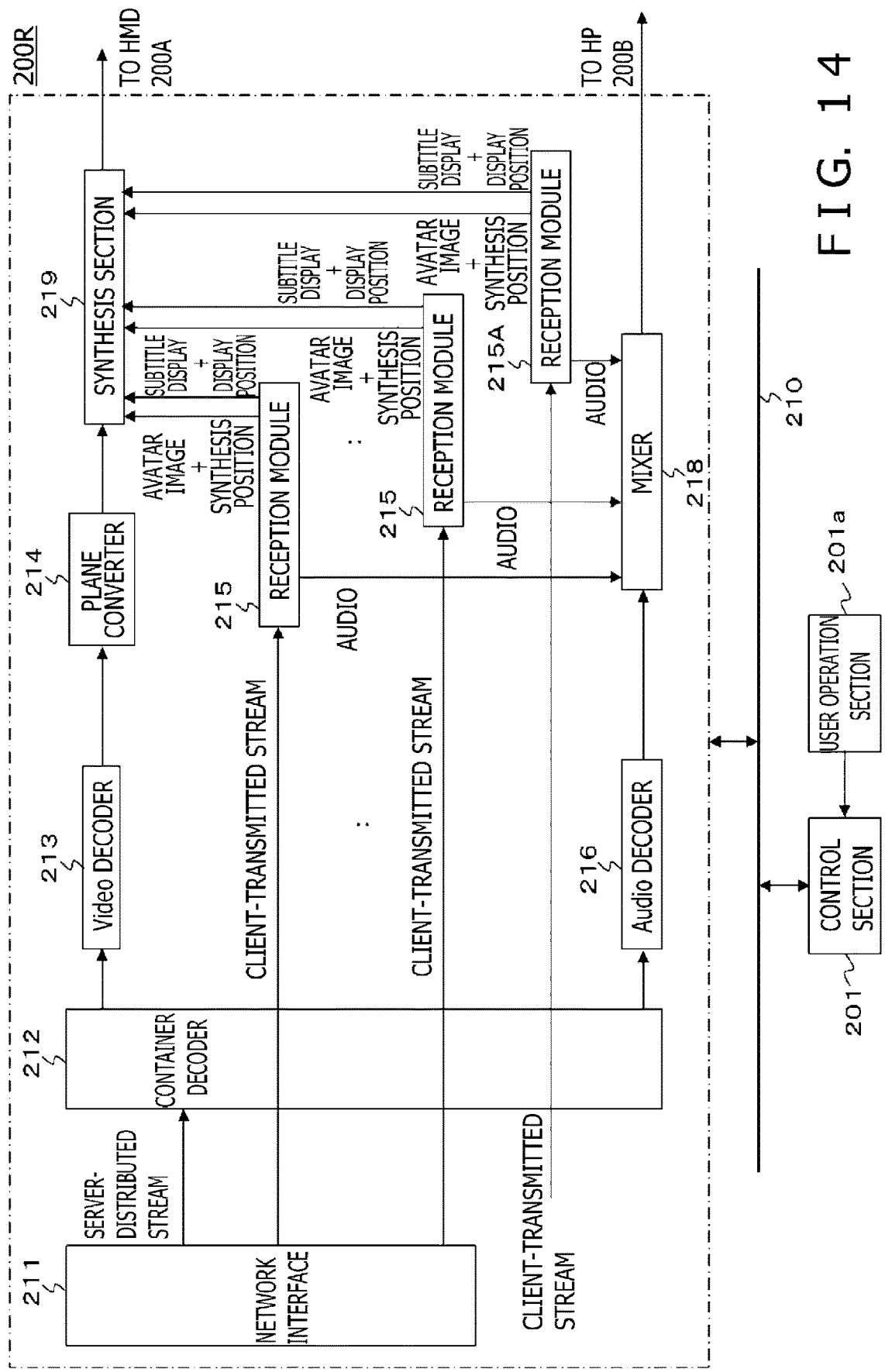
FIG. 14 is a block diagram depicting a typical configuration of the reception system of a client apparatus.

FIG. 14 depicts a typical configuration of a reception system 200R of the client apparatus 200. The reception system 200R includes a control section 201, a network interface 211, a container decoder 212, a video decoder 213, a plane converter 214, reception modules 215 and 215A, an audio decoder 216, a mixer 218, and a synthesis section 219. These components are interconnected via a bus 210.

The control section 201 controls the operation of the client apparatus 200, i.e., the operations of the respective components in the reception system 200R. The control section 201 is connected with the user operation section 201a. The network interface 211 communicates with the server 100 and with the other client apparatuses 200 via the network 300. The network interface 211 receives the above-described server-distributed stream from the server 100. The network interface 211 also receives the above-mentioned client-transmitted streams from the other client apparatuses 200.

The container decoder 212 extracts the video stream and the audio stream from the server-distributed stream (MP4 stream) received by the network interface 211. In this case, the container decoder 212 extracts the video attribute information box ("vaib" box) from the "udta" box defined in the initialization segment (IS) or in the "moof" box. The container decoder 212 transmits the extracted "vaib" box to the control section 201. This allows the control section 201 to recognize the capture information indicating the capture status of the camera, position information (GPS data) indicating the camera position (capture position), and information indicating the allowable synthesis range for avatars in the background image.

The video decoder 213 obtains the image data of the background image by performing a decoding process on the video stream extracted by the container decoder 212. The video decoder 213 further extracts a parameter set and an SEI message inserted in the video stream, and transmits the extracted information to the control section 201.

The extracted information also includes the above-mentioned video attribute_information SEI message (see FIG. 4). This allows the control section 201 to recognize the capture information indicating the capture status of the camera, position information (GPS data) indicating the camera position (capture position), and information indicating the allowable synthesis range for avatars in the background image.

If the image data of the background image obtained by the video decoder 213 is nonlinear image data, the plane converter 214 converts the nonlinear image data to linear image data. Further, if the image data of the background image is the image data of a wide viewing angle image, the plane converter 214 clips from the image data only a portion corresponding to the display viewing angle of the HMD 400A to obtain the display image data.

For example, the size of the allowable synthesis range for avatars in the background image is set corresponding to the display viewing angle of the HMD 400A. In its default state, the plane converter 214 clips the image data corresponding to the allowable synthesis range to obtain the display image data. Thereafter, the plane converter 214 changes the clipping range in accordance with the attitude of the head detected by sensors mounted on the HMD, for example.

The audio decoder 216 performs a decoding process on the audio stream extracted by the container decoder 212 so as to obtain two-channel audio data for audio reproduction by the headphones (HP) 400B. Note that where multichannel audio data such as 5.1-channel audio data is acquired through the decoding process, the audio decoder 216 downmixes the multichannel data to two-channel audio data.

The reception module 215 processes the client-transmitted stream received through the network interface 214 to obtain the image data of the avatar, synthesis position information about the avatar, subtitle display data corresponding to the avatar, display position information about the subtitles, and two-channel audio data corresponding to the avatar.

Further, the reception module 215A processes the client-transmitted stream generated by the transmission system 200T (see FIG. 8) of the own client apparatus 200 to obtain the image data of the avatar, synthesis position information about the avatar, subtitle display data corresponding to the avatar, display position information about the subtitles, and two-channel audio data corresponding to the avatar. The reception module 215A is installed to synthesize the own avatar on the background image. Note that, if the own client apparatus 200 is not equipped with the transmission system 200T (see FIG. 8), there is no need for the reception module 215A in the reception system 200R (see FIG. 14).

Figure 15:
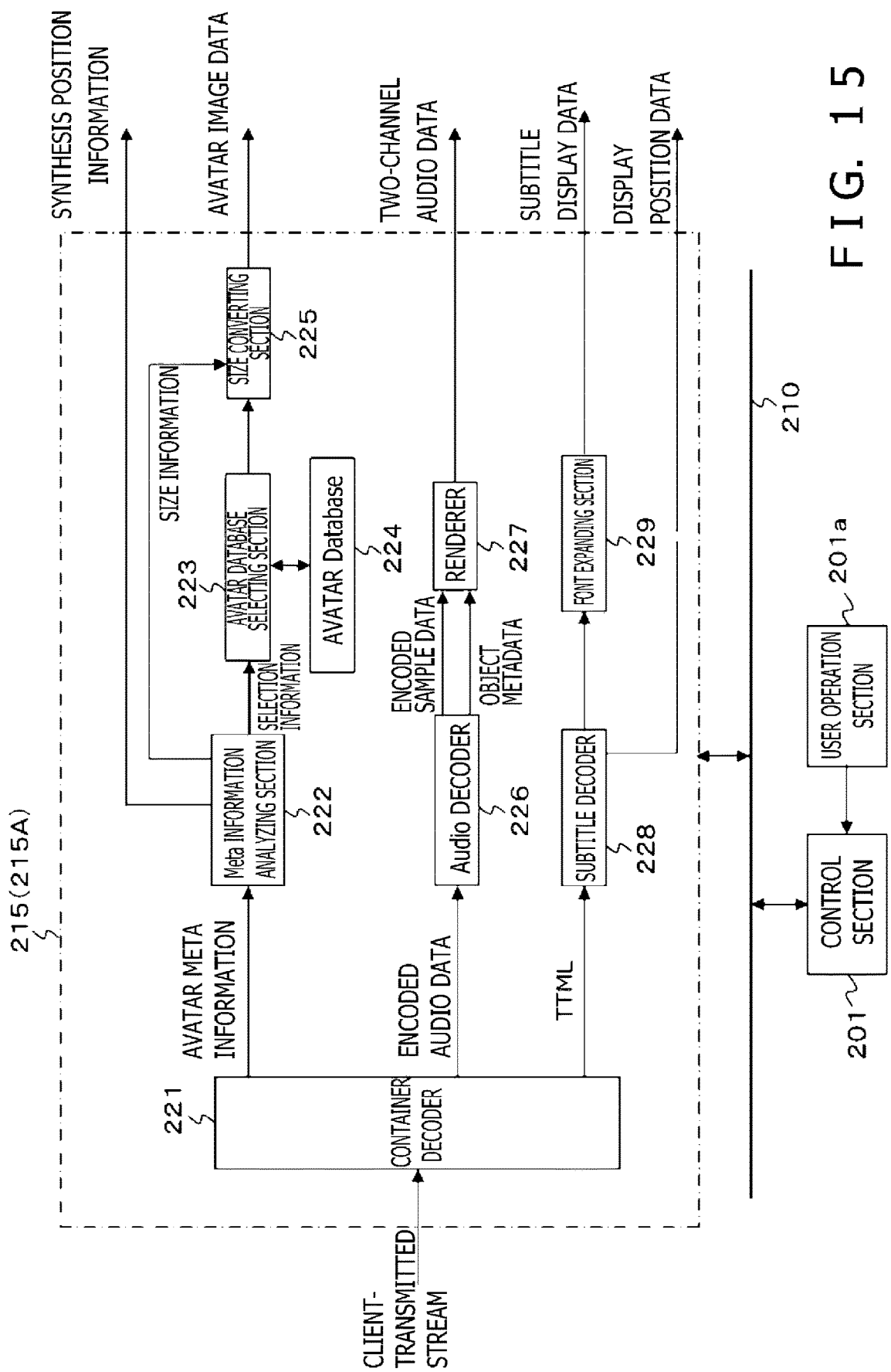
FIG. 15 is a block diagram depicting a typical configuration of a reception module.

FIG. 15 depicts a typical configuration of the reception module 215 (215A). The reception module 215 (215A) includes a container decoder 221, a meta information analyzing section 222, an avatar database selecting section 223, an avatar database 224, a size converting section 225, an audio decoder 226, a renderer 227, a subtitle decoder 228, and a font expanding section 229.

The container decoder 221 extracts avatar meta information, 3D Audio encoded audio data, and TTML as subtitle text information from the client-transmitted stream. The meta information analyzing section 222 analyzes the avatar meta information obtained by the container decoder 221.

The meta information analyzing section 222 obtains the selection information for acquiring from the avatar database 224 the image data of the avatar on the basis of the avatar database selection information (see FIG. 10). The selection information includes each piece of information "body_type" associated with the entire body type of the avatar, information "body_angle" associated with the angle of the avatar oriented relative to the front, information "emotional_type" associated with the type of the facial expression or emotion of the avatar, and information "face_angle" associated with the face angle of the avatar.

Further, on the basis of the avatar rendering control information (see FIG. 9), the meta information analyzing section 222 obtains information "avator_center_position_x" and "avator_center_position_y" associated with the avatar synthesis position in the allowable synthesis range in the background image and information "avator_rendering_size" associated with the size of the avatar.

The avatar database selecting section 223 obtains the image data of the avatar on the basis of avatar configuration data acquired from the avatar database 224 by referencing the selection information obtained by the meta information analyzing section 222.

Figure 16:
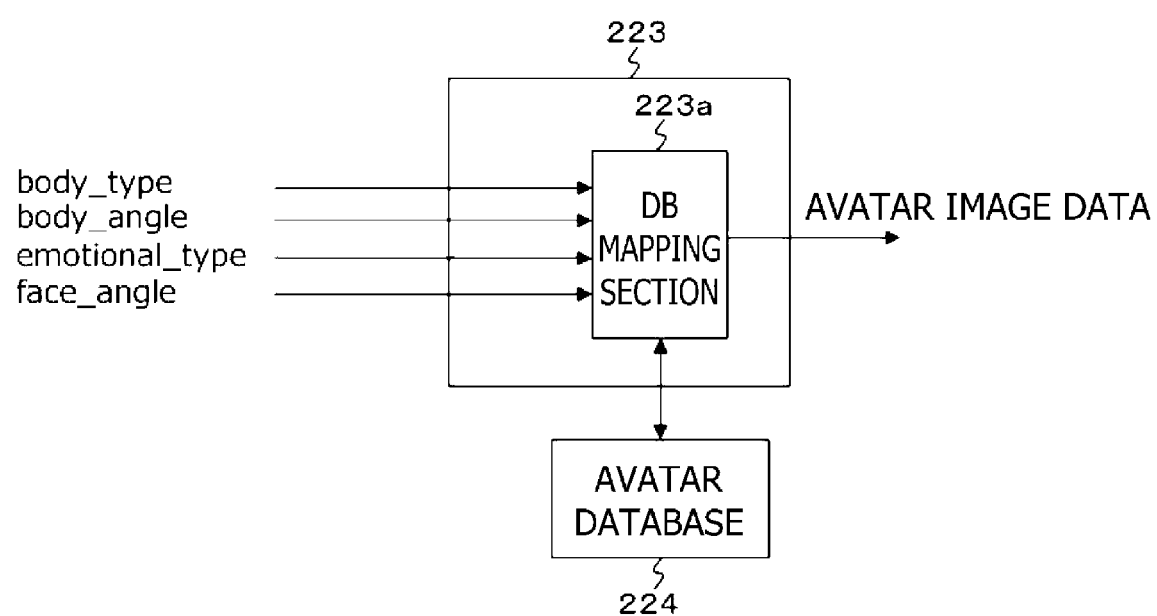
FIG. 16 is a block diagram depicting a typical configuration of an avatar database selecting section.

FIG. 16 depicts a typical configuration of the avatar database selecting section 223. The avatar database selecting section 223 includes a database mapping section 223a. The database mapping section 223a receives input of the information "body_type" associated with the entire body type of the avatar, information "body_angle" associated with the angle of the avatar oriented relative to the front, information "emotional_type" associated with the type of the facial expression or emotion of the avatar, and information "face_angle" associated with the face angle of the avatar. On the basis of these items of information, the database mapping section 223a acquires the avatar configuration data from the avatar database 224 and maps the acquired data to obtain the avatar image data.

FIG. 17 depicts a typical list of the avatar database 224. For example, three states, "standing upright", "sitting" and "lying", are held as the configuration data in the information "body_type" associated with the entire body type of the avatar. Further, as the configuration data in the information "body_angle" associated with the angle of the avatar oriented relative to the front, six states are held: "facing forward", "facing backward", "facing right", "facing left", "facing upward" and "facing downward", for example. Further, as the configuration data in the information "emotional_type" associated with the type of the facial expression or emotion of the avatar, four states are held: "expressionless", "smiling", "crying" and "angry", for example. Further, as the configuration data in the information "face_angle" associated with the face angle of the avatar, two states are held: "facing straight forward" and "downcast".

Returning to FIG. 15, the size converting section 225 performs a size conversion process on the avatar image data acquired by the avatar database selecting section 223 on the basis of the size information obtained by the meta information analyzing section 222, thereby acquiring the avatar image data converted in size.

The audio decoder 226 performs a decoding process on the audio encoded data obtained by the container decoder 221 to acquire the encoded sample data and the object metadata (voice object rendering information) as the object encoded data. The renderer 227 performs a rendering process on the encoded sample data and the object metadata obtained by the audio decoder 226 to acquire channel data for each speaker in such a manner that the avatar synthesis position in the background image coincides with the sound image position.

Figure 18:
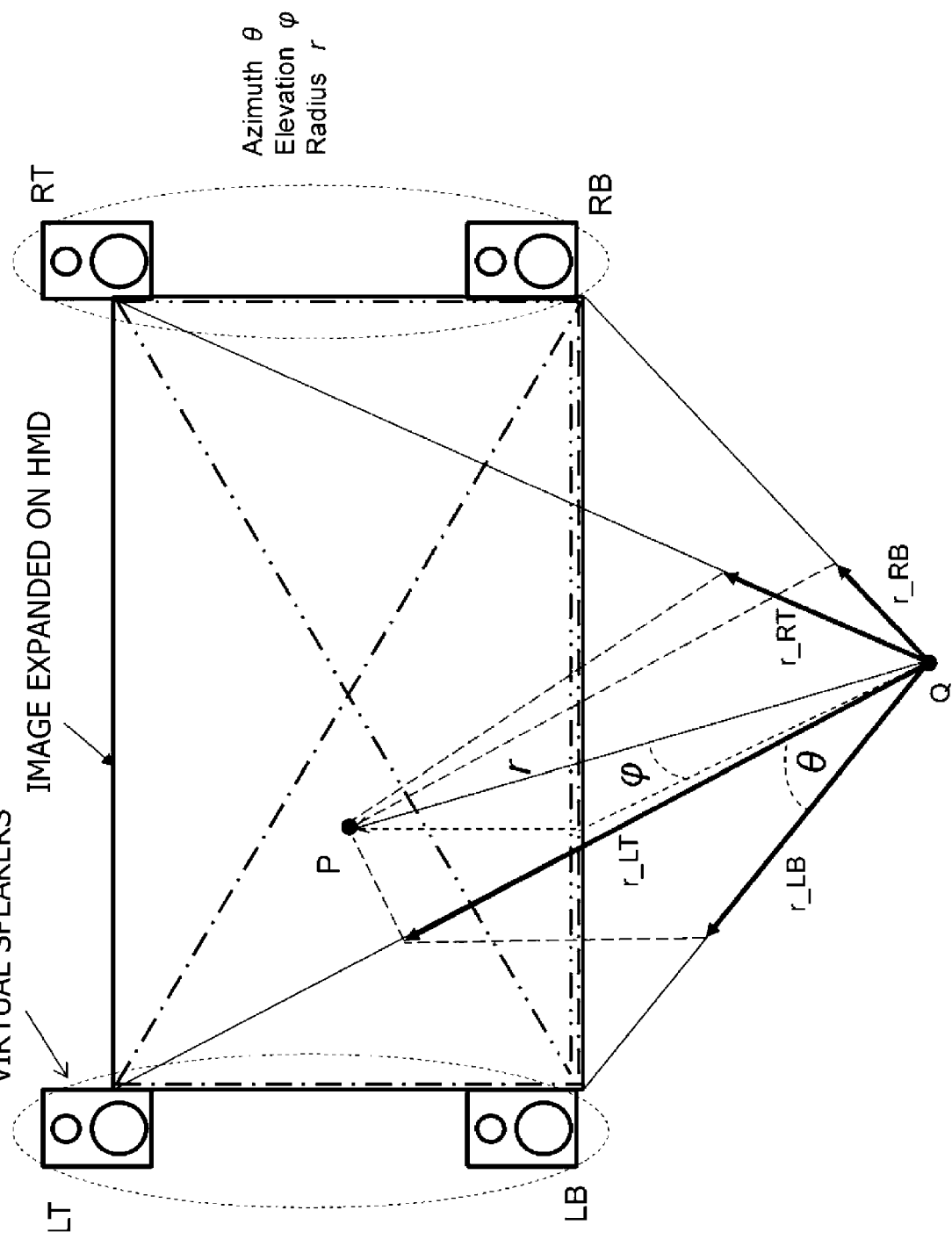
FIG. 18 is a schematic diagram outlining a rendering process performed by a renderer.

FIG. 18 outlines a rendering process performed by the renderer 227. In FIG. 18, the parts corresponding to those in FIG. 12 are designated by the same reference characters. The avatar position information ($\theta$, $\varphi$, r) included in the object metadata corresponds to the point P as the center coordinates of the avatar synthesis position in the image expanded on the HMD 400A.

Note that, as described above, the client apparatus 200 identifies the coordinates of the point P using the avatar synthesis position information ("avator_center_position_x", "avator_center_position_y") included in the avatar rendering control information (see FIG. 9). The point P and the point Q as the center of the presumed viewing position may then be used to obtain the values of "Azimuth", "Radius", and "Elevation" for use by the renderer 227 (see FIG. 12).

In that case, the value of "Radius" may be acquired either from the "Radius" value inserted in the voice object rendering information (see FIG. 11) transmitted from the server 100 or from the "Radius" value obtained with adjustment as per the size of the object (avatar) on the basis of the information "avator_rendering_size" included in the avatar rendering control information (see FIG. 9). The acquired value makes it possible to set the appropriate depth position of the avatar synthesis position.

The point P is projected to vectors r_LT, r_LB, r_RT and r_RB on axes Q-LT, Q-LB, Q-RT and Q-RB extended from the point Q as the center viewing position to the positions of the respective speakers. The sound pressure level of the channel data for each speaker is considered to correspond with the vector quantities of the four vectors.

Note that the example of FIG. 18 is a case in which the image expanded on the HMD 400A is in the default state, i.e., the expanded image on the HMD 400A corresponds to the allowable synthesis range for avatars in the background image. As discussed above, the clipping range of the plane converter 214 is changed in accordance with the attitude of the head detected by sensors mounted on the HMD.

In that case, the position of the point P in the image expanded on the HMD 400A is changed accordingly. Depending on the amount of the change, the point P may be positioned outside the image expanded on the HMD 400A. If that is the case, the renderer 227 sets the sound pressure level of the channel data for each speaker not on the basis of the position of the point P obtained from the avatar position information ($\theta$, $\varphi$, r) but in accordance with the changed position of the point P.

Also, the renderer 227 performs sound pressure control through remapping on the channel data for each speaker as mentioned above to convert the data into two-channel audio data for reproduction by the headphones 400B, before outputting the converted data to the latter. Note that, if audio output on the client side is performed not by the headphones 400B but by the speakers LT, LB, RT and RB, the sound pressure control through remapping is omitted.

Figure 19:
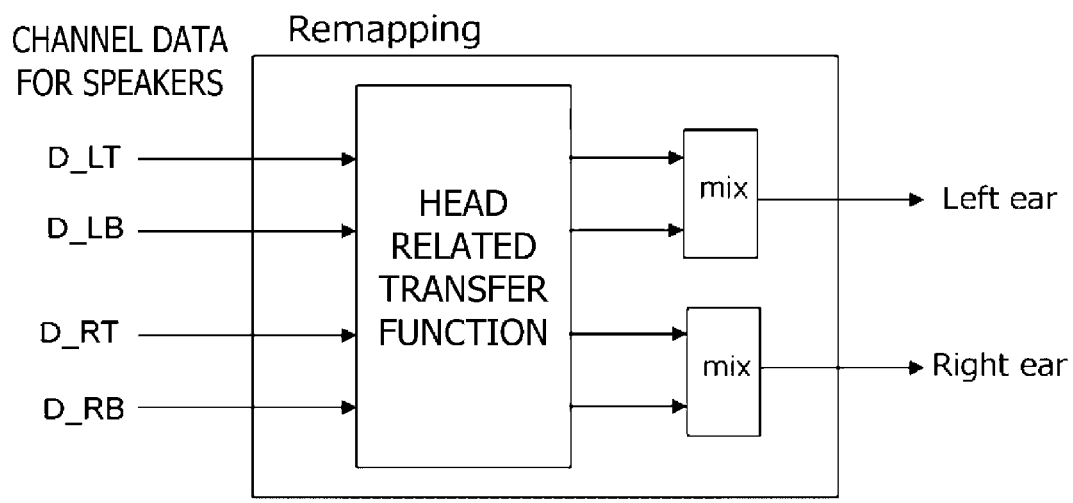
FIG. 19 is a schematic diagram outlining sound pressure control through remapping performed by the renderer.

FIG. 19 outlines sound pressure control through remapping performed by the renderer 227. Reference characters D_LT, D_LB, D_RT and D_RB denote the channel data output to the speakers LT, LB, RT and RB, respectively. Indications "Left ear" and "Right ear" stand for two-channel audio data for reproduction by the headphones 400B. The sound pressure control through remapping involves superposing on the data for each channel the transfer characteristics of the sound being transferred from the speakers to the left and right ears, which is known as the head related transfer function (HRTF), before combining and downmixing the data into the two-channel audio data.

Returning to FIG. 15, the subtitle decoder 228 obtains subtitle text data and control codes from the TTML acquired by the container decoder 221. Display position information is also obtained as one of the control codes. The font expanding section 229 obtains subtitle display data (bit map data) by expanding the font on the basis of the subtitle text data and control codes acquired by the subtitle decoder 228.

Below is a brief explanation of the operation of the reception module 215 (215A) depicted in FIG. 15. A client-transmitted stream is supplied to the container decoder 221. From the client-transmitted stream, the container decoder 221 extracts the avatar meta information, 3D Audio encoded audio data, and TTML as the subtitle text information.

The avatar meta information extracted by the container decoder 221 is supplied to the meta information analyzing section 222. On the basis of the avatar database selection information (see FIG. 10), the meta information analyzing section 222 acquires selection information for obtaining the avatar image data from the avatar database 224. The selection information includes each piece of information "body_type" associated with the entire body type of the avatar, information "body_angle" associated with the angle of the avatar oriented relative to the front, information "emotional_type" associated with the type of the facial expression or emotion of the avatar, and information "face_angle" associated with the face angle of the avatar.

Further, on the basis of the avatar rendering control information (see FIG. 9), the meta information analyzing section 222 acquires the information "avator_center_position_x" and "avator_center_position_y" associated with the avatar synthesis position in the allowable synthesis range in the background image and the information "avator_rendering_size" associated with the size of the avatar.

The selection information acquired by the meta information analyzing section 222 is supplied to the avatar database selecting section 223. The avatar database selecting section 223 obtains the avatar configuration data from the avatar database 224 on the basis of the selection information. The avatar database selecting section 223 maps the obtained data on the basis of the avatar configuration data to acquire the avatar image data.

The avatar image data acquired by the avatar database selecting section 223 is supplied to the size converting section 225. The size converting section 225 is also supplied with the avatar size information obtained by the meta information analyzing section 222. In accordance with the size information, the size converting section 225 performs a size conversion process on the avatar image data supplied from the avatar database selecting section 223 so as to obtain the avatar image data converted in size. The avatar image data thus obtained by the size converting section 225 is output from the reception module 215 (215A) together with the avatar synthesis position information acquired by the meta information analyzing section 222.

Further, the encoded audio data extracted by the container decoder 221 is supplied to the audio decoder 226. The audio decoder 226 performs a decoding process on the encoded audio data to obtain the encoded sample data and the object metadata (voice object rendering information) as the object encoded data. The object encoded data is supplied to the renderer 227.

The renderer 227 performs a rendering process on the object encoded data (encoded sample data and object metadata) obtained by the audio decoder 226 so as to generate channel data for the virtual speakers (see FIG. 18) placed at the top left, top right, bottom right, and bottom left of the image expanded on the HMD 400A, for example, in such a manner that the avatar synthesis position in the background image coincides with the position of the sound image.

Furthermore, the renderer 227 performs sound pressure control through remapping on the four-channel data using the head related transfer function (HRTF) so as to generate the two-channel audio data for reproduction by the headphones 400B (see FIG. 19). The two-channel audio data thus obtained by the renderer 227 is output from the reception module 215 (215A).

The TTML extracted by the container decoder 221 is supplied to the subtitle decoder 228. The subtitle decoder 228 obtains subtitle text data and control codes from the TTML. Display position information is also acquired as one of the control codes.

The subtitle text data and control codes obtained by the subtitle decoder 228 are supplied to the font expanding section 229. Based on the subtitle text data and control codes, the font expanding section 229 expands the font to acquire subtitle display data (bit map data). The subtitle display data thus obtained by the font expanding section 229 is output from the reception module 215 (215A) together with the subtitle display position information acquired by the subtitle decoder 228.

Returning to FIG. 14, the mixer 218 synthesizes the two-channel audio data obtained by the audio decoder 216 with the two-channel audio data acquired by the reception modules 215 and 215A (see FIG. 15) to obtain the two-channel audio data to be output to the headphones (HP) 400B.

Under control of the control section 201, the synthesis section 219 synthesizes the avatar image data obtained by the reception modules 215 and 215A on the display image data acquired by the plane converter 214 in such a manner that the avatar is placed at a specific position in the allowable synthesis range for avatars in the background image on the basis of the synthesis position information. Also, the synthesis section 219 synthesizes the subtitle display data obtained by the reception modules 215 and 215A as per the display position information so as to acquire the display image data to be output to the HMD 400A.

Note that the typical configuration of the reception system 200R depicted in FIG. 14 is an example that includes the reception module 215A for processing the client-transmitted stream generated by the transmission system 200T (see FIG. 8) of the own client apparatus 200. Alternatively, the reception module 215A may be replaced with a module that processes the avatar meta information, encoded audio data, and TTML generated by the transmission system 200T (see FIG. 8) of the own client apparatus 200 (i.e., the configuration excluding the container decoder 221 of the reception module 215A depicted in FIG. 15), or with a module that receives input of other data or information corresponding to the avatar meta information, encoded audio data, and TTML to obtain the similar output.

Below is a brief explanation of the operation of the reception system 200R depicted in FIG. 14. The network interface 211 receives the server-distributed stream from the server 100 via the network 300. The network interface 211 also receives the client-transmitted streams from the other client apparatuses 200 via the network 300.

The server-distributed stream received by the network interface 211 is supplied to the container decoder 212. The container decoder 212 extracts the video stream and audio stream from the server-distributed stream (MP4 stream).

Also, the container decoder 212 extracts the video attribute information box from the "udta" box defined in the initialization segment (IS) or in the "moof" box. The extracted box is forwarded to the control section 201. This allows the control section 201 to recognize the capture information indicating the capture status of the camera, position information (GPS data) indicating the camera position (capture position), and information indicating the allowable synthesis range for avatars in the background image.

Further, the video stream extracted by the container decoder 212 is supplied to the video decoder 213. The video decoder 213 performs a decoding process on the video stream to obtain the image data of the background image.

The video decoder 213 extracts the parameter set and the SEI message inserted in the video stream and forwards the extracted information to the control section 201. The extracted information also includes the video attribute information SEI message (see FIG. 4). This allows the control section 201 to recognize the capture information indicating the capture status of the camera, position information (GPS data) indicating the camera position (capture position), and information indicating the allowable synthesis range for avatars in the background image.

The image data of the background image obtained by the video decoder 213 is supplied to the plane converter 214. If the image data of the background image is nonlinear image data, the plane converter 214 converts the nonlinear image data to linear image data. Further, from the image data of the background image, the plane converter 214 clips only a portion corresponding to the display viewing angle of the HMD 400A to obtain the display image data.

For example, the size of the allowable synthesis range for avatars in the background image is set corresponding to the display viewing angle of the HMD 400A. In the default state, the image data corresponding to the allowable synthesis range is clipped to obtain the display image data. Thereafter, the clipping range is changed in accordance with the attitude of the head detected by sensors mounted on the HMD, for example.

Further, the audio stream extracted by the container decoder 212 is supplied to the audio decoder 216. The audio decoder 216 performs a decoding process on the audio stream to obtain the two-channel audio data for audio reproduction by the headphones (HP) 400B. Note that, if multichannel audio data such as 5.1-channel audio data is obtained through the decoding process, the audio decoder 216 down-mixes the multichannel audio data to the two-channel audio data.

Further, the client-transmitted stream received by the network interface 211 from another client apparatus 200 is supplied to the reception module 215. The reception module 215 processes the client-transmitted stream to obtain the image data of the avatar, synthesis position information about the avatar, subtitle display data corresponding to the avatar, display position information about the subtitles, and two-channel audio data corresponding to the avatar (see FIG. 15).

Further, the client-transmitted stream generated by the transmission system 200T (see FIG. 8) of the own client apparatus 200 is supplied to the reception module 215A. As with the reception module 215, the reception module 215A processes the client-transmitted stream to obtain the image data of the avatar, synthesis position information about the avatar, subtitle display data corresponding to the avatar, display position information about the subtitles, and two-channel audio data corresponding to the avatar (see FIG. 15).

The two-channel audio data obtained by the audio decoder 216 is supplied to the mixer 218. The mixer 218 is also supplied with the two-channel audio data acquired by the reception modules 215 and 215A. The mixer 218 synthesizes the two-channel audio data obtained by the audio decoder 216 with the two-channel audio data acquired by the reception modules 215 and 215A to obtain the two-channel audio data to be output to the headphones (HP) 400B.

The display image data obtained by the plane converter 214 is supplied to the synthesis section 219. The synthesis section 219 is also supplied with the avatar image data, avatar synthesis position information, subtitle display data, and display position information acquired by the reception modules 215 and 215A. The synthesis section 219 synthesizes the avatar image data obtained by the reception modules 215 and 215A on the display image data acquired by the plane converter 214 on the basis of the synthesis position information in such a manner that the avatar is placed at a specific position in the allowable synthesis range for avatars in the background image. Furthermore, the synthesis section 219 synthesizes the subtitle display data obtained by the reception modules 215 and 215A on the basis of the display position information, thereby acquiring the display image data to be output to the HMD 400A.

Figure 20:
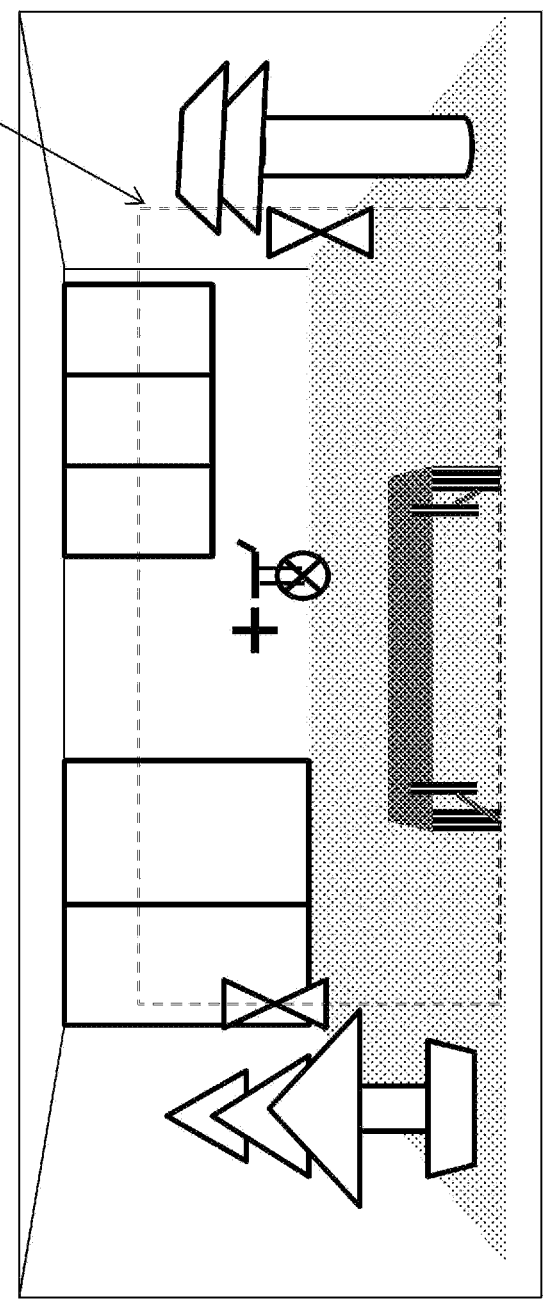
FIG. 20 is a schematic diagram depicting a typical background image.

FIG. 20 depicts a typical background image. A broken-line rectangular frame represents the allowable synthesis range (sy_window) for avatars. The center of this background image (indicated by a character "+") denotes the position corresponding to the information "camera_direction" and "camera_V_angle" in the video attribute information SEI message (see FIG. 4) or in the video attribute information box (see FIG. 7).

Figure 21:
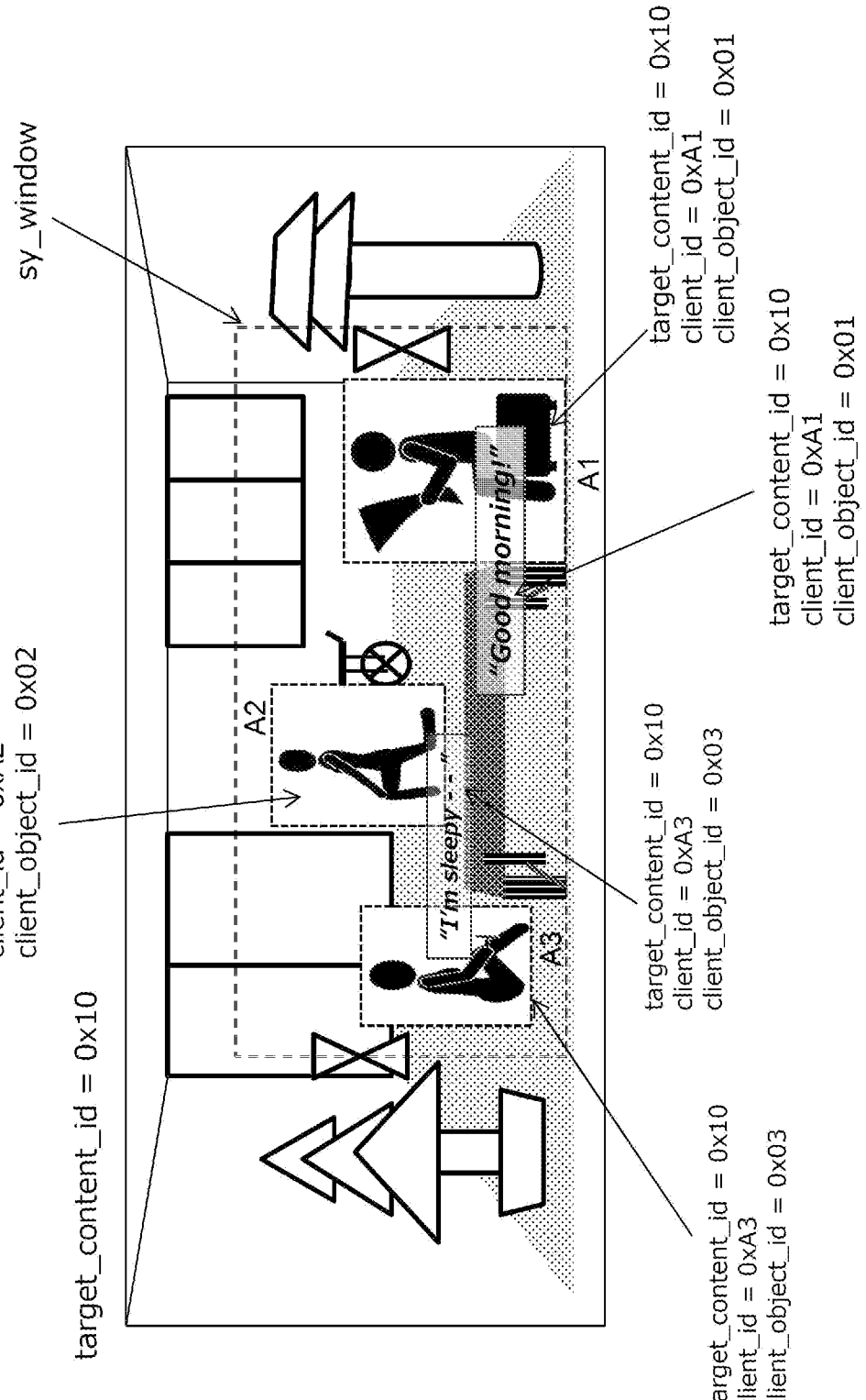
FIG. 21 is a schematic diagram depicting a typical state in which avatars and subtitles are synthesized in an allowable synthesis range (sy_window) of the background image.

FIG. 21 depicts a typical state in which avatars and subtitles are synthesized in the allowable synthesis range (sy_window) in the background image. In the illustrated example, three avatars A1, A2 and A3 and two rows of subtitles are presented synthesized. In this case, the avatar A1 and the subtitles associated therewith are from the client (client apparatus 200) whose information "client_id" is given as "0xA1". The avatar A2 is from the client whose information "client_id" is "0xA2". Further, the avatar A3 and the subtitles associated therewith are from the client (client apparatus 200) whose information "client_id" is "0xA3".

In the space-sharing display system 10 depicted in FIG. 1, as described above, the client apparatuses 200 each generate the avatar image data in the image data of the background image on the basis of the avatar meta information, and synthesizes the generated avatar image data on the image data of the background image. Thus each client can recognize the avatar of the other clients synthesized on a common background image. This allows the clients to share their VR spaces in agreeably communicating with one another.

Also in the space-sharing display system 10 depicted in FIG. 1, the audio data corresponding to the avatar meta information is included in the client-transmitted stream along with the object metadata. The client apparatus 200 may perform a rendering process on the audio data in a manner reflecting the object metadata to obtain the audio output data having the avatar synthesis position coinciding with the sound image position. This allows each client to recognize as if each avatar synthesized at its synthesis position in the background image emits voice of the client represented by the avatar.

Also in the space-sharing display system 10 depicted in FIG. 1, the subtitle data corresponding to the avatar meta information is included in the client-transmitted stream along with the display position information. The client apparatus 200 may synthesize the subtitle display data on the image data of the background image on the basis of the display position information in such a manner that the subtitles stemming from the subtitle data are displayed at a position corresponding to the avatar synthesis position. This allows each client to recognize the subtitles from the client represented by each avatar at a position corresponding to the synthesis position of the avatar in the background image.

Also in the space-sharing display system 10 depicted in FIG. 1, the information indicating the allowable synthesis range for avatars in the background image is transmitted inserted in a layer of the video stream obtained by encoding the image data of the background image and/or in a layer of the server-distributed stream including the video stream. This makes it easy for the client apparatus 200 to place the avatar of each client in the background image on the basis of the information indicating the allowable synthesis range and in a manner intended by the server 100.

2. Variations

Note that, in the above-described embodiment, each client apparatus 200 is provided apart from the HMD 400A for example. Alternatively, the HMD 400A and the client apparatus 200 may be integrally configured. Further, although not discussed above, a photographed image can be used as an avatar.

Also in the above embodiment, the container is an MP4 stream (ISOBMFF) for example. According to the present technology, however, the container may alternatively be in any suitable format such as MPEG-2 or MMT besides MP4.

The present technology, when implemented, may be configured preferably as follows:

(1) A client apparatus including:

a reception section configured to receive from a server a server-distributed stream including a video stream obtained by encoding a background image, the receiving section further receiving from another client apparatus a client-transmitted stream including proxy image meta information for displaying a proxy image of the other client; and a control section configured to control a decoding process of decoding the video stream to obtain the background image, a proxy image data generation process of generating the proxy image on the basis of the proxy image meta information, and an image data synthesis process of synthesizing the proxy image bases on the background image.

(2) The client apparatus as stated in paragraph (1) above, in which information indicating an allowable synthesis range for the proxy image in the background image is inserted in a layer of the video stream and/or in a layer of the server-distributed stream; and on the basis of the information indicating the allowable synthesis range, the control section controls the synthesis process in such a manner that the proxy image is placed inside the allowable synthesis range in the background image.

(3) The client apparatus as stated in paragraph (2) above, in which the proxy image meta information includes synthesis position information indicating a synthesis position in the allowable synthesis range for the proxy image; and the control section controls the synthesis process in such a manner that the proxy image is synthesized at the synthesis position indicated by the synthesis position information.

(4) The client apparatus as stated in paragraph (2) or (3) above, in which the proxy image meta information includes size information indicating a size of the proxy image; and the control section controls the synthesis process in such a manner that the proxy image is synthesized on the background image as per the size indicated by the size information.

(5) The client apparatus as stated in paragraph (3) above, in which the client-transmitted stream includes audio data corresponding to the proxy image meta information together with object metadata; and the control section further performs an audio output process in which a rendering process corresponding to the object metadata is carried out on the audio data to obtain audio output data of which a sound image position coincides with the synthesis position of the proxy image.

(6) The client apparatus as stated in paragraph (3) or (5) above, in which the client-transmitted stream includes subtitle data corresponding to the proxy image meta information together with display position information; and the control section further controls a subtitle synthesis process to synthesize, on the background image, subtitle display data on the basis of the display position information in such a manner that subtitles represented by the subtitle data are displayed at a position corresponding to the synthesis position of the proxy image.

(7) The client apparatus as stated in any one of paragraphs (1) to (6) above, further including a transmission section configured to transmit to another client apparatus a client-transmitted stream including proxy image meta information for displaying a proxy image of the own client;

in which the proxy image data generation process further generates the proxy image of the own client on the basis of the proxy image meta information for displaying the proxy image of the own client.

(8) The client apparatus as sated in any one of paragraphs (1) to (7) above, in which the background image is the image data of a wide viewing angle image;

the control section further controls an image clipping process of clipping a portion of the background image to obtain display image data.

(9) A client apparatus processing method including:

a reception step of causing a reception section to receive from a server a server-distributed stream including a video stream obtained by encoding a background image, and also to receive from another client apparatus a client-transmitted stream including proxy image meta information for displaying a proxy image of the other client; and a controlling step of causing a control section to control a decoding process of decoding the video stream to obtain the background image, a proxy image data generation process of generating the proxy image on the basis of the proxy image meta information, and an image data synthesis process of synthesizing the proxy image on the background image.

(10) A server including:

an imaging section configured to image a subject to obtain a background image; and a transmission section configured to transmit to a client apparatus a server-distributed stream including a video stream obtained by encoding the background image;

in which information indicating an allowable synthesis range for a proxy image in the background image is inserted in a layer of the video stream and/or in a layer of the server-distributed stream.

(11) The server as stated in paragraph (10) above, in which the background image is the image data of a wide viewing angle image.

(12) A server processing method including:

an imaging step of causing an imaging section to image a subject to obtain a background image; and a transmission step of causing a transmission section to transmit to a client apparatus a server-distributed stream including a video stream obtained by encoding the background image;

in which information indicating an allowable synthesis range for a proxy image in the background image is inserted in a layer of the video stream and/or in a layer of the server-distributed stream.

(13) A client apparatus including:

a receiver configured to receive from a server a server-distributed stream including a video stream obtained by encoding a background image, the background image having a viewing angle of at least 180 degrees, the receiver further configured to receive from another client apparatus a client-transmitted stream including representative image meta information corresponding to a representative image of the another client; and a controller configured to control a decoding process of decoding the video stream to obtain the background image, a representative image data generation process of generating the representative image on the basis of the representative image meta information, and an image data synthesis process of synthesizing the representative image based on the background image.

(14) The client apparatus according to (13), wherein information indicating an allowable synthesis range for the representative image in the background image is inserted in a layer of the video stream and/or in a layer of the server-distributed stream; and on the basis of the information indicating the allowable synthesis range, the controller is configured to control the synthesis process so that the representative image is placed inside the allowable synthesis range in the background image.

(15) The client apparatus according to (14), wherein the representative image meta information includes synthesis position information indicating a synthesis position in the allowable synthesis range for the representative image; and the controller is configured to control the synthesis process in such a manner that the representative image is synthesized at the synthesis position indicated by the synthesis position information.

(16) The client apparatus according to (14), wherein the representative image meta information includes size information indicating a size of the representative image; and the controller is configured to control the synthesis process so the representative image is synthesized on the background image as per the size indicated by the size information.

(17) The client apparatus according to (15), wherein the client-transmitted stream includes audio data corresponding to the representative image meta information together with object metadata; and the controller is further configured to perform an audio output process in which a rendering process corresponding to the object metadata is carried out on the audio data to obtain audio output data of which a sound image position coincides with the synthesis position of the representative image.

(18) The client apparatus according to (15), wherein the client-transmitted stream includes text data corresponding to the representative image meta information together with display position information; and the controller is further configured to control a text synthesis process to synthesize, on the background image, text display data on the basis of the display position information so text represented by the text data is displayed at a position corresponding to the synthesis position of the representative image.

(19) The client apparatus according to (13), further comprising a transmitter configured to transmit to the another client apparatus a client-transmitted stream including representative image meta information for displaying a representative image of the another client;

wherein the representative image data generation process further generates the representative image of the another client on the basis of the representative image meta information for displaying the representative image of the another client.

(20) The client apparatus according to (13), wherein the background image is the image data of a wide viewing angle image, the wide viewing angle being 270 degrees or more;

the controller further controls an image clipping process of clipping a portion of the background image to obtain display image data.

(21) A client apparatus processing method including:

receiving with a receiver a server-distributed stream from a server that includes a video stream obtained by encoding a background image, the transmitter image having a viewing angle of at least 180 degrees, and also receiving from another client apparatus a client-transmitted stream including representative image meta information for displaying a representative image of the another client; and controlling with controller a decoding process of decoding the video stream to obtain the background image, a representative image data generation process of generating the representative image on the basis of the representative image meta information, and an image data synthesis process of synthesizing the representative image based on the background image.

(22) A server including:

an imaging device configured to capture an image of a subject to obtain a background image, the background image having a viewing angle of at least 180 degrees; and a transmitter configured to transmit to a client apparatus a server-distributed stream including a video stream obtained by encoding the background image;

wherein information indicating an allowable synthesis range for a representative image in the background image is inserted in a layer of the video stream and/or in a layer of the server-distributed stream.

(23) The server according to (22), wherein for the image data of the background image is the image data of a wide viewing angle image, the wide viewing angle being at least 180 degrees.

(24) A non-transitory computer readable medium having computer readable instructions that when executed by a processor perform a method, the method including:

receiving with a receiver a server-distributed stream from a server that includes a video stream obtained by encoding a background image, the transmitter image having a viewing angle of at least 180 degrees, and also receiving from another client apparatus a client-transmitted stream including representative image meta information for displaying a representative image of the another client; and controlling with controller
a decoding process of decoding the video stream to obtain the background image,
a representative image data generation process of generating the representative image on the basis of the representative image meta information, and
an image data synthesis process of synthesizing the representative image based on the background image.

A major feature of the present technology is that the avatar meta information is included in the client-transmitted stream from another client apparatus. The image data of the avatar generated as per the avatar meta information is synthesized on the background image. This allows each client to recognize the avatars of the other clients synthesized on a common background image. The clients can thus share their VR spaces in agreeably communicating with one another (see FIGS. 2 and 21).

REFERENCE SIGNS LIST

10 Space-sharing display system
100 Server
101 Control section
101a User operation section
102 Locator
103 Video capture device
104 Format converting section
105 Video encoder
106 Audio capture device
108 Audio encoder
109 Container encoder
110 Network interface
111 Bus
200 Client apparatus
200T Transmission system
200R Reception system
201 Control section
201a User operation section
202 Metadata generator
203 Audio capture device
204 Object information generating section
205 Audio encoder
206 Character generating section
207 Subtitle encoder
208 Container encoder
209 Network interface
210 Bus
211 Network interface
212 Container decoder
213 Video decoder
214 Plane converter
215, 215A Reception module
216 Audio decoder
218 Mixer
219 Synthesis section
221 Container encoder
222 Meta information analyzing section
223 Avatar database selecting section
223a Database mapping section
224 Avatar database
225 Size converting section
226 Audio decoder
227 Renderer
228 Subtitle decoder
229 Font expanding section
300 Network
400A Head-mounted display (HMD)
400B Headphones (HP)

The invention claimed is:

1. A client apparatus comprising:
a receiver configured to receive a server-distributed stream including a video stream obtained by encoding a background image, the background image having a viewing angle of at least 180 degrees, the receiver further configured to receive from another client apparatus a client-transmitted stream including audio data and representative image meta information corresponding to a representative image of the another client apparatus, the representative image meta information including synthesis position information indicating a synthesis position of the representative image within the background image; and
processing circuitry configured to
decode the video stream to obtain the background image,
generate the representative image on the basis of the representative image meta information,
perform an audio output process on the audio data of the client-transmitted stream to generate audio output data having a sound position corresponding to the synthesis position of the representative image within the background image, and
synthesize the representative image on the background image based on the synthesis position information.

2. The client apparatus according to claim 1, wherein information indicating an allowable synthesis range for the representative image in the background image is inserted in a layer of the video stream and/or in a layer of the server-distributed stream; and
on the basis of the information indicating the allowable synthesis range, the processing circuitry is configured to perform the synthesizing such that the representative image is placed inside the allowable synthesis range in the background image.

3. The client apparatus according to claim 2, wherein the synthesis position information included in the representative image meta information is in the allowable synthesis range for the representative image; and
the processing circuitry is configured to perform the synthesizing such that the representative image is synthesized at the synthesis position indicated by the synthesis position information.

4. The client apparatus according to claim 2, wherein the representative image meta information includes size information indicating a size of the representative image; and
the processing circuitry is configured to perform the synthesizing such that the representative image is synthesized on the background image according to the size indicated by the size information.

5. The client apparatus according to claim 3, wherein the client-transmitted stream includes the audio data corresponding to the representative image meta information together with object metadata; and
the processing circuitry is further configured to perform the audio output process in which a rendering process corresponding to the object metadata is carried out on the audio data to obtain the audio output data having the sound position that is the same as the synthesis position of the representative image.

6. The client apparatus according to claim 3, wherein the client-transmitted stream includes text data corresponding to the representative image meta information together with display position information; and the processing circuitry is further configured to control a text synthesis process to synthesize, on the background image, text display data on the basis of the display position information so text represented by the text data is displayed at a position corresponding to the synthesis position of the representative image.

7. The client apparatus according to claim 1, further comprising a transmitter configured to transmit to the another client apparatus a client-transmitted stream including representative image meta information for displaying a representative image of the client apparatus.

8. The client apparatus according to claim 1, wherein the background image is a wide viewing angle image, the wide viewing angle being 270 degrees or more;

the processing circuitry is further configured to control an image clipping process of clipping a portion of the background image to obtain display image data.

9. A client apparatus processing method comprising:

receiving with a receiver a server-distributed stream from a server that includes a video stream obtained by encoding a background image, the background image having a viewing angle of at least 180 degrees, and also receiving from another client apparatus a client-transmitted stream including audio data and representative image meta information for displaying a representative image of the another client apparatus, the representative image meta information including synthesis position information indicating a synthesis position of the representative image within the background image; and controlling with processing circuitry decoding the video stream to obtain the background image, generating the representative image on the basis of the representative image meta information, performing an audio output process on the audio data of the client-transmitted stream to generate audio output data having a sound position corresponding to the synthesis position of the representative image within the background image, and synthesizing the representative image on the background image based on the synthesis position information.

10. A server comprising:

an imaging circuitry configured to capture an image of a subject to obtain a background image, the background image having a viewing angle of at least 180 degrees; and a transmitter configured to transmit to a client apparatus a server-distributed stream including a video stream obtained by encoding the background image;

wherein information indicating an allowable synthesis range is inserted in a layer of the video stream and/or in a layer of the server-distributed stream, the allowable synthesis range corresponding to a sub-section of the background image indicating that placement of a representative image is allowed only in the sub-section of the background image.

11. The server according to claim 10, wherein the background image is a wide viewing angle image, the wide viewing angle being at least 180 degrees.

12. A non-transitory computer readable medium having computer readable instructions that, when executed by a processor, perform a method, the method comprising:

receiving with a receiver a server-distributed stream from a server that includes a video stream obtained by encoding a background image, the background image having a viewing angle of at least 180 degrees, and also receiving from another client apparatus a client-transmitted stream including audio data and representative image meta information for displaying a representative image of the another client apparatus, the representative image meta information including synthesis position information indicating a synthesis position of the representative image within the background image; and controlling with processing circuitry decoding the video stream to obtain the background image, generating the representative image on the basis of the representative image meta information, performing an audio output process on the audio data of the client-transmitted stream to generate audio output data having a sound position corresponding to the synthesis position of the representative image within the background image, and synthesizing the representative image on the background image based on the synthesis position information.

* * * * *